(12) United States Patent
Meirav et al.

(10) Patent No.: US 9,375,672 B2
(45) Date of Patent: Jun. 28, 2016

(54) MODULAR, HIGH-THROUGHPUT AIR TREATMENT SYSTEM

(71) Applicant: Enverid Systems, Inc., Newton, MA (US)

(72) Inventors: Udi Meirav, Newton, MA (US); Israel Biran, Avihayil (IL)

(73) Assignee: ENVERID SYSTEMS, INC., Needham, MA (US)

( * ) Notice: Subject to any disclaimer, the term of this patent is extended or adjusted under 35 U.S.C. 154(b) by 0 days.

(21) Appl. No.: 14/221,961

(22) Filed: Mar. 21, 2014

(65) Prior Publication Data

US 2014/0202330 A1 Jul. 24, 2014

Related U.S. Application Data

(63) Continuation of application No. 13/024,214, filed on Feb. 9, 2011, now Pat. No. 8,690,999.

(51) Int. Cl.
*B01D 53/02* (2006.01)
*B01D 53/04* (2006.01)
(Continued)

(52) U.S. Cl.
CPC .......... *B01D 53/0407* (2013.01); *B01D 53/047* (2013.01); *B01D 53/0462* (2013.01); *B01D 53/62* (2013.01); *B01D 53/72* (2013.01); *B60H 3/06* (2013.01); *F24F 3/1603* (2013.01);
(Continued)

(58) Field of Classification Search
CPC .................. B01D 2253/102; B01D 2253/104; B01D 2253/106; B01D 2253/108; B01D 2253/204; B01D 2257/504; B01D 2257/708; B01D 2258/06; B01D 2259/4508; B01D 2259/4566; B01D 2259/4575; B01D 53/0407; B01D 53/0462; B01D 53/047; B01D 53/62; B01D 53/72; B60H 3/06; F24F 3/1603; Y02C 10/04; Y02C 10/08
See application file for complete search history.

(56) References Cited

U.S. PATENT DOCUMENTS

| | | | |
|---|---|---|---|
| 1,522,480 | A | 1/1925 | Allen |
| 1,836,301 | A | 12/1931 | Bechtold |

(Continued)

FOREIGN PATENT DOCUMENTS

| | | |
|---|---|---|
| CA | 2640152 A1 | 4/2010 |
| CN | 2141873 Y | 9/1993 |

(Continued)

OTHER PUBLICATIONS

"EPA Ventilation and Air Quality in Offices, Fact Sheet" United States Environmental Protection Agency, Air and Radiation (6609J), Revised Jul. 1990.

(Continued)

*Primary Examiner* — Christopher P Jones
(74) *Attorney, Agent, or Firm* — Cooley LLP

(57) ABSTRACT

Air treatment modules, systems and methods for removing contaminants from indoor air are provided. Device embodiments may include one or more air inlets, one or more air outlets and a plurality of inserts which each include at least one adsorbent material. The inserts may be arranged separate from each other to form a plurality of substantially parallel air flow paths between the one or more air inlets and one or more air outlets. The adsorbent material may be arranged for regeneration within the air treatment module using thermal swing desorption and/or pressure swing desorption. Related systems, methods and articles of manufacture are also described.

20 Claims, 15 Drawing Sheets

(51) Int. Cl.
  *B01D 53/047* (2006.01)
  *B01D 53/62* (2006.01)
  *B01D 53/72* (2006.01)
  *B60H 3/06* (2006.01)
  *F24F 3/16* (2006.01)

(52) U.S. Cl.
  CPC ..... *B01D2253/102* (2013.01); *B01D 2253/104* (2013.01); *B01D 2253/106* (2013.01); *B01D 2253/108* (2013.01); *B01D 2253/204* (2013.01); *B01D 2257/504* (2013.01); *B01D 2257/708* (2013.01); *B01D 2258/06* (2013.01); *B01D 2259/4508* (2013.01); *B01D 2259/4566* (2013.01); *B01D 2259/4575* (2013.01); *F24F 2003/1621* (2013.01); *F24F 2003/1625* (2013.01); *F24F 2003/1639* (2013.01); *Y02C 10/04* (2013.01); *Y02C 10/08* (2013.01)

(56) References Cited

U.S. PATENT DOCUMENTS

| | | |
|---|---|---|
| 3,107,641 A | 10/1963 | Haynes |
| 3,511,595 A | 5/1970 | Fuchs |
| 3,619,130 A | 11/1971 | Ventriglio et al. |
| 3,702,049 A | 11/1972 | Morris, Jr. |
| 3,751,848 A | 8/1973 | Ahlstrand |
| 3,808,773 A | 5/1974 | Reyhing et al. |
| 3,885,928 A | 5/1975 | Wu |
| 4,182,743 A | 1/1980 | Rainer et al. |
| 4,228,197 A | 10/1980 | Means |
| 4,249,915 A | 2/1981 | Sircar et al. |
| 4,292,059 A | 9/1981 | Kovach |
| 4,322,394 A | 3/1982 | Mezey et al. |
| 4,325,921 A | 4/1982 | Aiken et al. |
| 4,433,981 A | 2/1984 | Slaugh et al. |
| 4,451,435 A | 5/1984 | Holter et al. |
| 4,530,817 A | 7/1985 | Hölter et al. |
| 4,551,304 A | 11/1985 | Holter et al. |
| 4,559,066 A | 12/1985 | Hunter et al. |
| 4,711,645 A | 12/1987 | Kumar |
| 4,810,266 A | 3/1989 | Zinnen et al. |
| 4,892,719 A | 1/1990 | Gesser |
| 4,917,862 A | 4/1990 | Kraw et al. |
| 4,987,952 A | 1/1991 | Beal et al. |
| 5,046,319 A | 9/1991 | Jones |
| 5,087,597 A | 2/1992 | Leal et al. |
| 5,137,548 A | 8/1992 | Grenier et al. |
| 5,186,903 A | 2/1993 | Cornwell |
| 5,221,520 A | 6/1993 | Cornwell |
| 5,231,063 A | 7/1993 | Fukumoto et al. |
| 5,281,254 A | 1/1994 | Birbara et al. |
| 5,290,345 A | 3/1994 | Osendorf et al. |
| 5,292,280 A | 3/1994 | Janu et al. |
| 5,322,473 A | 6/1994 | Hofstra et al. |
| 5,352,274 A | 10/1994 | Blakley |
| 5,376,614 A | 12/1994 | Birbara et al. |
| 5,389,120 A | 2/1995 | Sewell et al. |
| 5,464,369 A | 11/1995 | Federspiel |
| 5,492,683 A | 2/1996 | Birbara et al. |
| 5,584,916 A | 12/1996 | Yamashita et al. |
| 5,675,979 A | 10/1997 | Shah |
| 5,707,005 A | 1/1998 | Kettler et al. |
| 5,827,355 A | 10/1998 | Wilson |
| 5,869,323 A | 2/1999 | Horn |
| 5,876,488 A | 3/1999 | Birbara et al. |
| 5,948,355 A | 9/1999 | Fujishima et al. |
| 5,964,927 A | 10/1999 | Graham et al. |
| 5,984,198 A | 11/1999 | Bennett et al. |
| 6,027,550 A | 2/2000 | Vickery |
| 6,102,793 A | 8/2000 | Hansen |
| 6,113,674 A | 9/2000 | Graham et al. |
| 6,123,617 A | 9/2000 | Johnson |
| 6,187,596 B1 | 2/2001 | Dallas et al. |
| 6,280,691 B1 | 8/2001 | Homeyer et al. |
| 6,364,938 B1 | 4/2002 | Birbara et al. |
| 6,432,367 B1 | 8/2002 | Munk |
| 6,533,847 B2 | 3/2003 | Seguin et al. |
| 6,547,854 B1 | 4/2003 | Gray et al. |
| 6,605,132 B2 | 8/2003 | Fielding |
| 6,623,550 B2 | 9/2003 | Shah et al. |
| 6,711,470 B1 | 3/2004 | Hartenstein et al. |
| 6,726,558 B1 | 4/2004 | Meirav |
| 6,773,477 B2 | 8/2004 | Lindsay |
| 6,796,896 B2 | 9/2004 | Laiti |
| 6,797,246 B2 | 9/2004 | Hopkins |
| 6,866,701 B2 | 3/2005 | Meirav |
| 6,908,497 B1 | 6/2005 | Sirwardane |
| 6,916,239 B2 | 7/2005 | Siddaramanna et al. |
| 6,916,360 B2 | 7/2005 | Seguin et al. |
| 6,930,193 B2 | 8/2005 | Yaghi et al. |
| 6,974,496 B2 | 12/2005 | Wegeng et al. |
| 7,288,136 B1 | 10/2007 | Gray et al. |
| 7,407,533 B2 | 8/2008 | Steins |
| 7,407,633 B2 | 8/2008 | Potember et al. |
| 7,449,053 B2 | 11/2008 | Hallam |
| 7,472,554 B2 | 1/2009 | Vosburgh |
| 7,645,323 B2 | 1/2010 | Massenbauer-Strafe et al. |
| 7,662,746 B2 | 2/2010 | Yaghi et al. |
| 7,666,077 B1 | 2/2010 | Thelen |
| 7,802,443 B2 | 9/2010 | Wetzel |
| 7,891,573 B2 | 2/2011 | Finkam et al. |
| 8,157,892 B2 | 4/2012 | Meirav |
| 8,317,890 B2 | 11/2012 | Raether et al. |
| 8,491,710 B2 | 7/2013 | Meirav |
| 2001/0021363 A1 | 9/2001 | Poles et al. |
| 2002/0056373 A1 | 5/2002 | Fielding |
| 2002/0078828 A1 | 6/2002 | Kishkovich et al. |
| 2002/0083833 A1 | 7/2002 | Nalette et al. |
| 2002/0147109 A1 | 10/2002 | Branover et al. |
| 2002/0183201 A1 | 12/2002 | Barnwell et al. |
| 2002/0193064 A1 | 12/2002 | Michalakos et al. |
| 2003/0097086 A1 | 5/2003 | Gura |
| 2003/0188745 A1 | 10/2003 | Deas et al. |
| 2004/0005252 A1 | 1/2004 | Siess |
| 2004/0069144 A1* | 4/2004 | Wegeng et al. ................ 95/106 |
| 2004/0118287 A1 | 6/2004 | Jaffe et al. |
| 2005/0191219 A1 | 9/2005 | Uslenghi et al. |
| 2005/0262869 A1 | 12/2005 | Tongu et al. |
| 2005/0284291 A1 | 12/2005 | Alizadeh-Khiavi et al. |
| 2006/0032241 A1 | 2/2006 | Gontcharov et al. |
| 2006/0054023 A1 | 3/2006 | Raetz et al. |
| 2006/0079172 A1 | 4/2006 | Fleming et al. |
| 2006/0148642 A1 | 7/2006 | Ryu et al. |
| 2006/0249019 A1 | 11/2006 | Roychoudhury et al. |
| 2008/0078289 A1 | 4/2008 | Sergi et al. |
| 2008/0119356 A1 | 5/2008 | Ryu et al. |
| 2008/0127821 A1 | 6/2008 | Noack et al. |
| 2008/0135060 A1 | 6/2008 | Kuo et al. |
| 2008/0182506 A1 | 7/2008 | Jackson et al. |
| 2008/0210768 A1 | 9/2008 | You |
| 2008/0293976 A1 | 11/2008 | Olah et al. |
| 2009/0000621 A1 | 1/2009 | Haggblom et al. |
| 2009/0120288 A1 | 5/2009 | Lackner et al. |
| 2009/0220388 A1 | 9/2009 | Monzyk et al. |
| 2009/0260372 A1 | 10/2009 | Skinner et al. |
| 2010/0076605 A1 | 3/2010 | Harrod et al. |
| 2010/0154636 A1 | 6/2010 | Liu et al. |
| 2010/0254868 A1 | 10/2010 | Obee et al. |
| 2010/0262298 A1 | 10/2010 | Johnson et al. |
| 2010/0278711 A1 | 11/2010 | Find |
| 2011/0064607 A1 | 3/2011 | Hedman |
| 2011/0079143 A1 | 4/2011 | Marotta et al. |
| 2011/0085933 A1 | 4/2011 | Mazyck et al. |
| 2011/0146494 A1 | 6/2011 | Desai et al. |
| 2011/0179948 A1 | 7/2011 | Choi et al. |
| 2011/0189075 A1 | 8/2011 | Wright et al. |
| 2011/0192172 A1 | 8/2011 | Delacruz |
| 2011/0198055 A1 | 8/2011 | Meirav et al. |
| 2011/0206572 A1 | 8/2011 | McKenna et al. |
| 2011/0250121 A1 | 10/2011 | Schmidt |
| 2011/0262327 A1 | 10/2011 | Dillon et al. |
| 2011/0265648 A1 | 11/2011 | Meirav |
| 2011/0269919 A1 | 11/2011 | Min et al. |

(56) References Cited

U.S. PATENT DOCUMENTS

| | | |
|---|---|---|
| 2011/0277490 A1 | 11/2011 | Meirav |
| 2011/0296872 A1 | 12/2011 | Eisenberger |
| 2012/0004092 A1 | 1/2012 | Raatschen et al. |
| 2012/0012005 A1 | 1/2012 | Burke |
| 2012/0052786 A1 | 3/2012 | Clawsey |
| 2012/0076711 A1 | 3/2012 | Gebald et al. |
| 2012/0148858 A1 | 6/2012 | Wu |
| 2012/0168113 A1 | 7/2012 | Karamanos |
| 2012/0216676 A1 | 8/2012 | Addiego et al. |
| 2012/0222500 A1 | 9/2012 | Riess et al. |
| 2013/0052113 A1 | 2/2013 | Molins et al. |

FOREIGN PATENT DOCUMENTS

| | | |
|---|---|---|
| CN | 101500704 A | 8/2009 |
| CN | 201363833 Y | 12/2009 |
| EP | 0 475493 A2 | 3/1992 |
| ES | 2387791 A1 | 10/2012 |
| JP | 56-158126 A | 12/1981 |
| JP | 59-225232 A | 12/1984 |
| JP | 60194243 | 10/1985 |
| JP | 02-092373 A | 3/1990 |
| JP | 09085043 A | 3/1997 |
| JP | 2001-170435 A | 6/2001 |
| JP | 2001232127 A | 8/2001 |
| JP | 3207936 B2 | 9/2001 |
| JP | 2005-090941 A | 4/2005 |
| JP | 2006275487 A | 10/2006 |
| JP | 2009-202137 A | 9/2009 |
| JP | 2010-149086 A | 7/2010 |
| WO | WO 8805693 A1 | 8/1988 |
| WO | WO 0208160 A1 | 1/2002 |
| WO | WO-0212796 A2 | 2/2002 |
| WO | WO-2007128584 A1 | 11/2007 |
| WO | WO 2008155543 A2 | 12/2008 |
| WO | WO 2009126607 A2 | 10/2009 |
| WO | WO 2010091831 A1 | 8/2010 |
| WO | WO 2010124388 A1 | 11/2010 |
| WO | WO 2011114168 A1 | 9/2011 |
| WO | WO 2011146478 A1 | 11/2011 |
| WO | WO 2012134415 A1 | 10/2012 |
| WO | WO 2012158911 A2 | 11/2012 |
| WO | WO 2013/074973 A1 | 5/2013 |
| WO | WO 2013/106573 A1 | 7/2013 |

OTHER PUBLICATIONS

International Search Report and The Written Opinion of the International Searching Authority for International Application No. PCT/US2011/036801 date of mailing Sep. 27, 2011.
Gesser, H.D., "The Reduction of Indoor Formaldehyde Gas and that Emanating from Urea Formaldehyde Foam Insulation (UFFI)", Environmental International, vol. 10, pp. 305-308, 1984.
Jones, Christopher W., "$CO_2$ Capture from Dilute Gases as a Component of Modern Global Carbon Management", Annual Review of Chemical and Biomolecular Engineering, vol. 2, pp. 31-52, 2011.
Ma, Chanjuan et al., "Removal of low-concentration formaldehyde in air by adsorption on activated carbon modified by hexamethylene diamine", Carbon, vol. 49, pp. 2869-2877, 2011.
Nuckols, M. L. et al., "Technical Manual: Design Guidelines for Carbon Dioxide Scrubbers", Naval Coastal Systems Center, vol. 4110, pp. 1-83, Revision A, Jul. 1985.
United States Environmental Protection Agency, "Carbon Adsorption for Control of VOC Emissions: Theory and Full Scale System Performance", vol. 450, pp. 88-012, Jun. 1988.
Serna-Guerrero, Rodrigo et al., "Triamine-grafted pore-expanded mesoporous silica for $CO_2$ capture: Effect of moisture and adsorbent regeneration strategies", Adsorption, vol. 16, pp. 567-575, 2010.
International Search Report and Written Opinion, mailed Sep. 5, 2012 for PCT/US2012/024333.
International Search Report and Written Opinion, mailed Jul. 25, 2013 for PCT/US2013/035933.
International Search Report and Written Opinion, mailed Dec. 20, 2013 for PCT/US2013/051077.
International Search Report and Written Opinion, mailed Jan. 3, 2014 for PCT/US2013/042239.
International Search Report and Written Opinion, mailed Mar. 22, 2013 for PCT/US2012/065600.
International Search Report and Written Opinion, mailed Mar. 29, 2013 for PCT/US2013/021033.
International Search Report and Written Opinion, mailed Mar. 17, 2014 for PCT/US2013/070383.
International Search Report and Written Opinion, mailed Jul. 10, 2014 for PCT/US2014/023488.
International Search Report and Written Opinion, mailed Aug. 15, 2014 for PCT/US2014/031009.
International Search Report and Written Opinion, mailed Nov. 24, 2014 for PCT/US2014/055863.
International Search Report and Written Opinion, mailed Nov. 24, 2014 for PCT/US2014/056097.
Sidheswaran, Meera A. et al., "Energy efficient indoor VOC air cleaning with activated carbon filter (ACF) filters", Building and Environment, vol. 47, Apr. 2011, pp. 357-367.
Zorflex® ACC, 100% Activated Woven Carbon Cloth, Calgon Carbon Corporation, 2008, www.calgoncarbon.com, 2 pages.
Zorflex® ACC, 100% Activated Woven Carbon Cloth, Calgon Carbon Corporation, 2011, www.calgoncarbon.com, 2 pages.
Gray, M. L. et al., "Performance of immobilized tertiary amine solid sorbents for the capture of carbon dioxide", International Journal of Greenhouse Gas Control, vol. 2, Issue 1, Jan. 2008, pp. 3-8.
International Preliminary Report on Patentability, mailed Nov. 29, 2012, for PCT/US2011/036801.
International Preliminary Report on Patentability, mailed Aug. 22, 2013, for PCT/US2012/024333.
International Preliminary Report on Patentability, mailed May 30, 2014 for PCT/US2012/065600.
International Preliminary Report on Patentability, mailed Jul. 24, 2014 for PCT/US2013/021033.
International Preliminary Report on Patentability, mailed Oct. 23, 2014 for PCT/US2013/035933.
International Preliminary Report on Patentability, mailed Dec. 4, 2014 for PCT/US2013/042239.
International Preliminary Report on Patentability, mailed Jan. 29, 2015 for PCT/US2013/051077.
International Search Report and Written Opinion, mailed Dec. 19, 2013 for PCT/US2013/061422.
International Preliminary Report on Patentability, mailed Apr. 2, 2015 for PCT/US2013/061422.
International Preliminary Report on Patentability, mailed May 28, 2015 for PCT/US2013/070383.
International Search Report and Written Opinion, mailed Sep. 2, 2014, for PCT/US2014/035114.
International Search Report and Written Opinion, mailed May 15, 2015, for PCT/US2015/015690.
Goeppert et al., "Carbon Dioxide Capture from the Air Using a Polyamine Based Regenerable Solid Adsorbent," J. Am. Chem. Soc., vol. 133, No. 50, Nov. 21, 2011 pp. 20164-20167 entire document.
International Search Report and Written Opinion, mailed May 5, 2014, for PCT/US2014/011078.
International Search Report and Written Opinion, mailed Jan. 28, 2013, for PCT/US2012/038343.
International Preliminary Report on Patentability, mailed Nov. 28, 2013, for PCT/US2012/038343.
International Preliminary Report on Patentability, mailed Jul. 23, 2015, for PCT/US2014/011078.

* cited by examiner

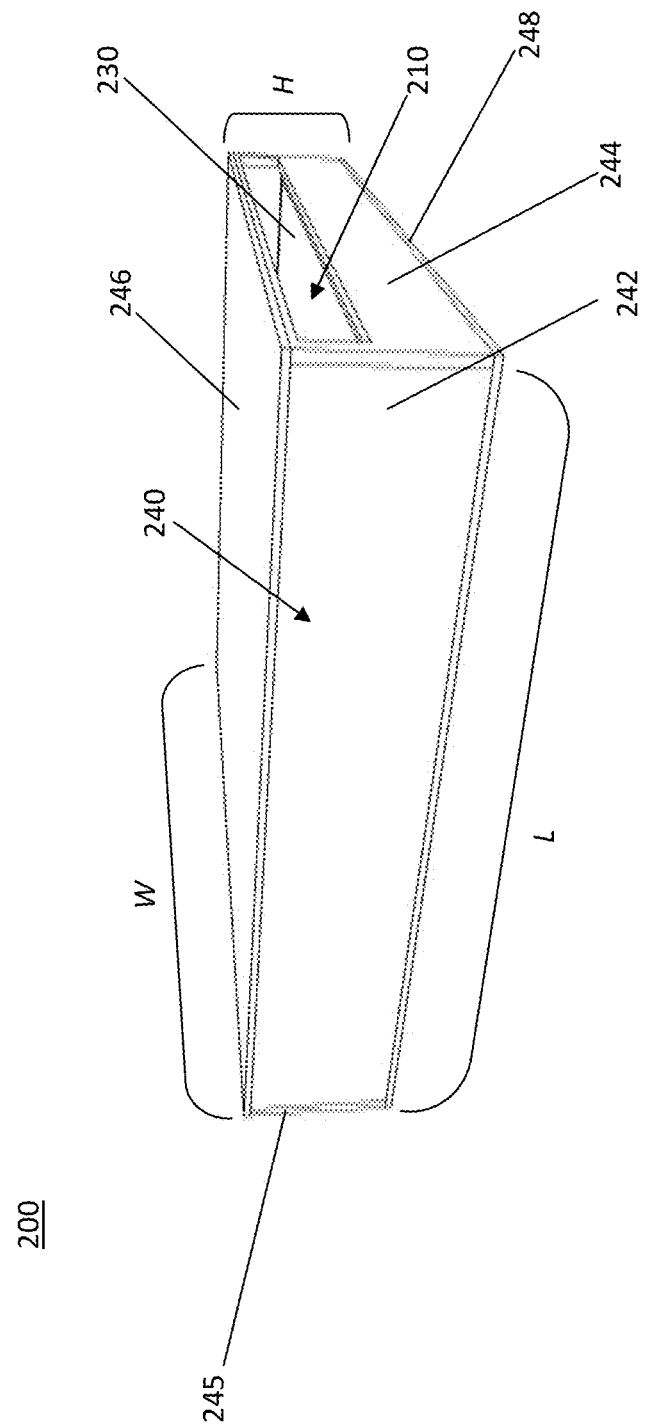

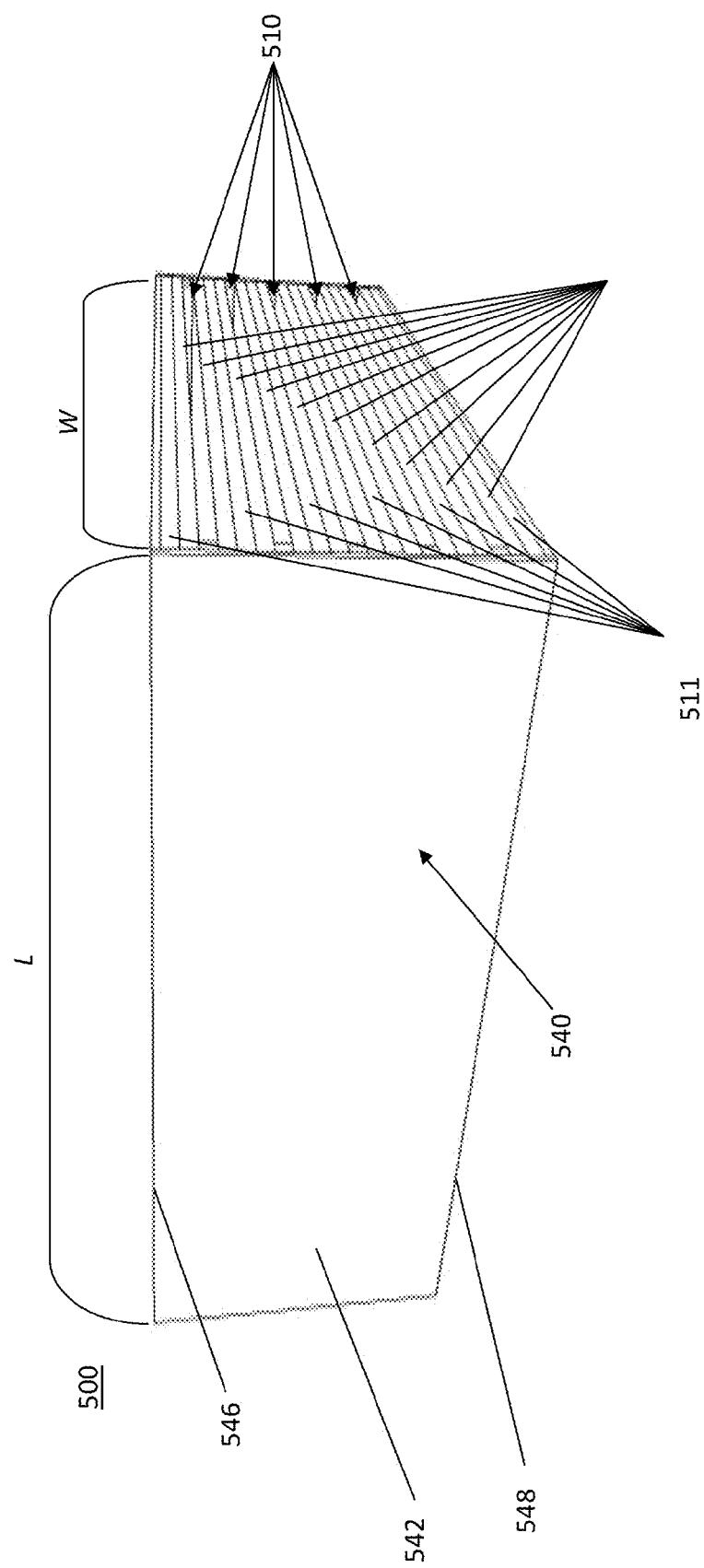

MODULAR, HIGH-THROUGHPUT AIR TREATMENT SYSTEM

CROSS-REFERENCE TO RELATED APPLICATIONS

This application is a continuation of U.S. patent application Ser. No. 13/024,214 filed on Feb. 9, 2011 and incorporates the disclosure of this application herein by reference in its entirety.

FIELD

The subject matter described herein relates to removing contaminants from indoor air using regenerable adsorbent materials included within one or more air treatment modules of a scalable air treatment system.

BACKGROUND

Heating, ventilation and/or air conditioning ("HVAC") systems are common and indeed essential in most, if not all, modern buildings, structures and other human-occupied spaces. HVAC systems seek to maintain the indoor air quality ("IAQ") at an acceptable level within such spaces by providing comfortable and healthy conditions in terms of air temperature, humidity, composition and cleanliness. HVAC systems constitute a significant part of a building's energy budget, particularly in extreme climates.

The heating, ventilating and air conditioning functions of HVAC systems cooperate to maintain thermal comfort, acceptable IAQ levels and pressure relationships between two or more human-occupied spaces within a building or other structure. HVAC systems, for example, may circulate air through the rooms of a building using an air handling unit, which mechanically forces air to flow through a network of ducts installed within the building, while adjusting air temperature and humidity to maintain comfortable conditions. While these typical HVAC systems have one or more air filters for capturing small particles and/or vapors, more thorough treatment is well-beyond the capability of these conventional filters. As a result, to maintain the IAQ of a building at an acceptable level, traditional HVAC systems exhaust some fraction of the contaminated indoor circulating air outside the building as exhaust air and replace it with some amount of fresh outside air, also known as "makeup air". This process of changing or replacing indoor circulating air with makeup air is done primarily to counteract the accumulation of organic and inorganic contaminants created by human occupants, machines (e.g., computers or copiers), cleaning agents, building materials and/or pesticides, which gradually compromise the quality and safety of the indoor air. Removing such contaminants directly from the indoor air, rather than replacing the indoor air with makeup air from outside a building, may reduce the energy required to cool, dehumidify and/or heat makeup air or eliminate the need to use makeup air altogether.

SUMMARY

Embodiments of the present disclosure may be directed to a practical, modular and scalable system for removing contaminants from the circulating air in an HVAC system, utilizing regenerable adsorbent materials and an adsorption-desorption cycle. Treating large volumes of indoor air having low concentrations of organic and inorganic contaminants requires bringing large volumes of adsorbent materials into intimate contact with large volumes of circulating indoor air. It may be advantageous to treat large volumes of circulating indoor air without requiring large pressure gradients and using minimal power and energy consumption. It may also be advantageous to use air treatment systems that are scalable and relatively compact in size so as to be readily installed in existing buildings by human operators. Furthermore, different buildings may have different air flow requirements and contaminant levels. To efficiently and practically manufacture and deploy air treatment systems adaptable to a wide variety of buildings, it may be advantageous to provide a modular air treatment system design based on a relatively limited set of standard products that are easily manufactured and combine to provide scalable solutions for different building sizes and air quality requirements. It may also be advantageous to make air treatment systems that are easily integrated with existing HVAC systems rather than replacing existing infrastructure.

The present disclosure is thus directed to air treatment modules for removing contaminants from indoor air that may include one or more air inlets, one or more air outlets and a plurality of inserts that may each include at least one adsorbent material, where the inserts may be arranged separate from each other to form a plurality of substantially parallel air flow paths between the one or more air inlets and one or more air outlets. In some embodiments, the at least one adsorbent material may be arranged for regeneration within the air treatment module using at least one of thermal swing desorption and pressure swing desorption. In some embodiments, the plurality of inserts may be arranged in a sheet-like form. Some embodiments may include a support frame having one or more structural support members for supporting the plurality of inserts, wherein the one or more air inlets and one or more air outlets are formed by the support frame and the plurality of inserts. Some embodiments may include an air intake plenum adjacent an intake side of the air treatment module and in communication with the one or more air inlets and an air outtake plenum adjacent an outtake side of the air treatment module and in communication with the one or more air outlets.

Embodiments of the air treatment module may also be configured for incorporation within a heating, ventilation and/or air conditioning system. The air treatment module may include one or more valves that control the amount of indoor air that flows between the air treatment module and the heating, ventilating and/or air conditioning system. In some embodiments, the one or more valves may substantially stop indoor air from flowing between the air treatment module and the heating, ventilation and/or air conditioning system. In other embodiments, the one or more valves may be used to divert only a portion of the total amount of indoor within the heating, ventilation and/or air conditioning system into the air treatment module. In some embodiments, the air treatment module may involve positioning the plurality of inserts within the support frame at an angle relative to the plurality of substantially parallel air flow paths between the one or more air inlets and one or more air outlets. The air treatment module may also have one or more air inlets and one or more air outlets of the support frame that are offset from each other to force indoor air flowing between the one or more air inlets and one or more air outlets to flow through the at least one adsorbent material. In some embodiments, the at least one adsorbent material may be selected from the group consisting of zeolite, activated charcoal, silica gel, porous alumina and metal-organic-framework materials and/or may remove carbon dioxide or volatile organic compounds from the indoor air.

Embodiments of the air treatment modules of the present disclosure may also include a support frame that includes an inlet side and an outlet side, where one or more air inlets are formed in the inlet side and one or more air outlets are formed in the outlet side. The one or more air inlets and one or more air outlets may be formed adjacent to each other along one side of the support frame. In some embodiments, the air treatment module may be positioned downstream of a central cooling unit of the heating, ventilation and/or air conditioning system. In some embodiments, the air treatment module may include sensors to measure temperature, pressure, flow rate and/or gas composition.

The present disclosure may also relate to air treatment systems for removing contaminants from indoor air. These systems may include a plurality of air treatment modules which may each have one or more air inlets, one or more air outlets and one or more inserts. The inserts may each include at least one adsorbent material, according to some embodiments. The at least one adsorbent material may be arranged for regeneration within each of the plurality of air treatment modules using at least one of thermal swing desorption and pressure swing desorption. In some system embodiments, the plurality of air treatment modules may be aligned adjacent to each other and in communication with a common inlet plenum and a common outlet plenum and the one or more inserts of the plurality of air treatment modules may form a plurality of substantially parallel air flow paths. In some embodiments, the one or more inserts may be arranged in a sheet-like form. Some system embodiments may include arranging the plurality of air treatment modules in a vertical stack and/or horizontally. The air treatment systems of the present disclosure may be positioned within a commercial, residential, industrial, military or public building, depending on the particular embodiment.

The present disclosure also contemplates methods for removing contaminants from indoor air. The methods may include providing a plurality of air treatment modules, where each air treatment module may have one or more air inlets, one or more air outlets and one or more inserts which may each include at least one adsorbent material. The at least one adsorbent material may be arranged for regeneration within each of the plurality of air treatment modules using at least one of thermal swing desorption and pressure swing desorption. The methods may also include arranging the plurality of air treatment modules adjacent to each other, wherein the one or more inserts of the plurality of air treatment modules may form a plurality of substantially parallel air flow paths. The methods may further include directing the flow of the indoor air from an air intake plenum into the one or more air inlets of the plurality of air treatment modules, through one or more of the plurality of substantially parallel air flow paths, through one or more of the at least one adsorbent material and through the one or more air outlets into an air outtake plenum. In some embodiments, the air inlet plenum and air outlet plenum may be configured for communication with a heating, ventilation and/or air conditioning system. In some embodiments, the one or more inserts may be arranged in a sheet-like form.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed embodiments. In the drawings.

FIG. 2a shows an embodiment of an air treatment module according to some embodiments of the present disclosure.

FIG. 4a shows the inlet end of the air treatment module and FIG. 4b shows the outlet end of the air treatment module.

FIGS. 5a and 5b show an embodiment of an air treatment module according to some embodiments of the present disclosure. FIG. 5a shows the inlet end of the air treatment module and FIG. 5b shows the outlet end of the air treatment module.

Like reference symbols in the various drawings indicate like elements.

DETAILED DESCRIPTION

Devices, systems and methods for removing contaminants from indoor air using high-capacity, regenerable adsorbent materials arranged in a compact, parallel configuration are provided herein. Some embodiments of the present disclosure may be directed to modular and scalable air treatment modules having one or more removable inserts including one or more adsorbent materials. The air treatment modules may be vertically stacked and/or horizontally arranged to form a compact air treatment system for providing a large surface area for removing contaminants from large volumes of circulating indoor air. Embodiments of the present disclosure may provide air treatment systems that improve indoor air quality using high-capacity adsorbent materials, such as for example molecular sieves for removing contaminants, like carbon dioxide ($CO_2$).

Figure 1:
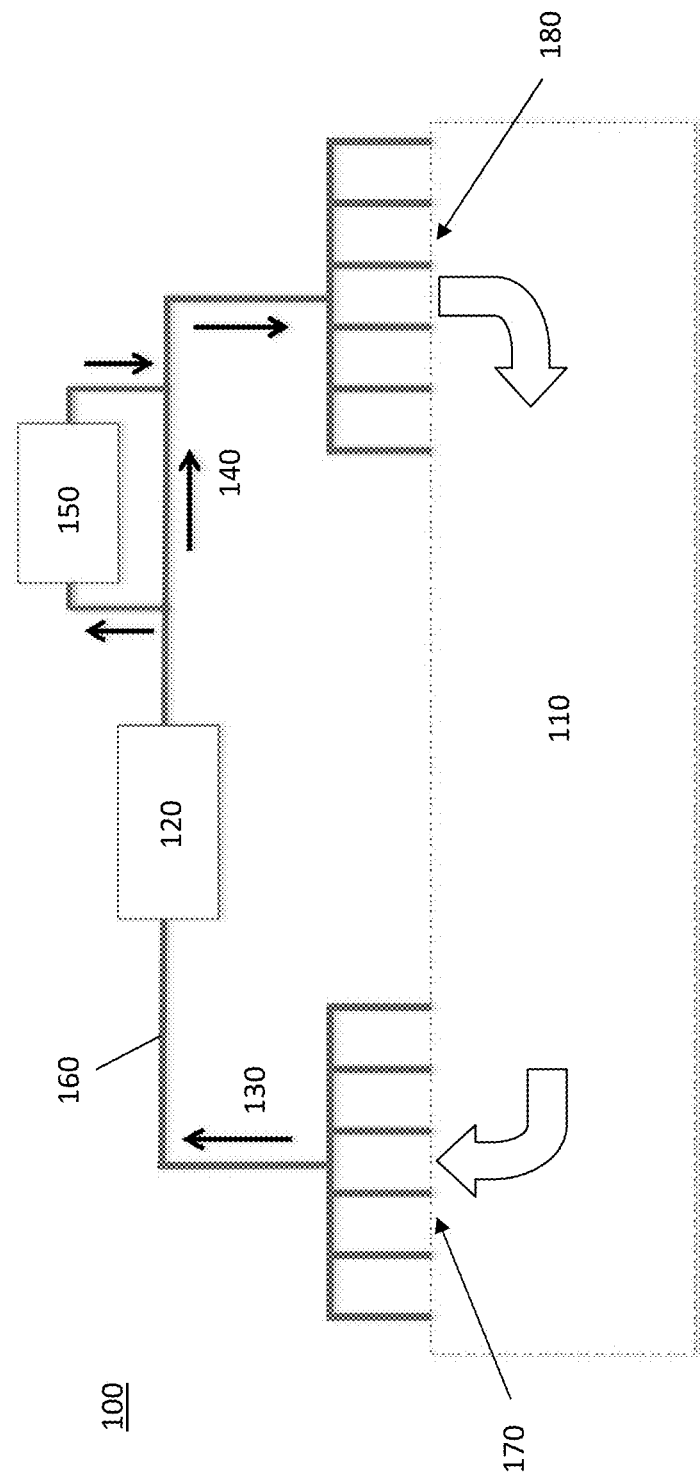
FIG. 1 shows an HVAC system according to some embodiments of the present disclosure.

FIG. 1 shows a basic configuration of an HVAC system 100. In some embodiments, the system 100 may be located within a building, vehicle or other structure and configured for heating, ventilating and/or air conditioning a human-occupied space 110. Some embodiments of the system 100 may be used for heating, ventilating and/or air conditioning a plurality of human-occupied spaces 110 within a building, vehicle or other structure. A building according to the present disclosure may include without limitation an office building, residential building, store, mall, hotel, hospital, restaurant, airport, train station and/or school. A vehicle according to the present disclosure may include without limitation an automobile, ship, train, plane or submarine.

In some embodiments, the system 100 may include a central air handling unit 120 and an air treatment system 150. The air treatment system 150 may be located upstream of the air handling unit 120 or downstream of the unit 120, as shown in FIG. 1. The air handling unit 120 and air treatment system 150 may be in fluid communication with each other, as well as human-occupied space 110, via a network of ducts 160. In some embodiments, the amount of indoor air that flows into and out of the air treatment system 150 may be automatically and/or manually controlled by one or more valves. The valves may be positioned within the ducts 160 upstream and/or downstream of the air treatment system 150. In some embodiments, the valves may serve to isolate the air treatment system 150 from the rest of the system 100 such that there is no fluid communication between the system 100 and air treatment system 150 and air flow into and out of the system 150 is substantially stopped.

As shown in FIG. 1, indoor air may flow into the ducts 160 as return air received from one or more intakes 170 (e.g., vents and/or ducts) of human-occupied space 110 and flow toward air handling unit 120, as indicated by arrow 130. Air handling unit 120 may include, among other things, a blower for circulating air through the ducts 160 and into and out of human-occupied space 110 and heating or cooling elements and filter racks or chambers for heating, cooling and cleaning the air. Air released from the air handling unit 120 may be referred to as supply air, the flow of which is denoted in FIG. 1 by arrows 140. In some embodiments of the present disclosure, the one or more valves of the system 100 and/or air treatment system 150 may be adjusted to allow some or all of the supply air to be diverted to the air treatment system 150 and thereafter recombined with the main flow of supply air flowing towards human-occupied space 110, as denoted by arrows 140. Embodiments of the air treatment system 150 of the present disclosure may be configured to remove unwanted gases, vapors and contamination, including without limitation volatile organic compounds (VOCs) and $CO_2$ produced within human-occupied space 110 by human occupants. Other contaminant gases found within human-occupied space 110 that may be removed by air treatment system 150 may include without limitation carbon monoxide, sulfur oxides and/or nitrous oxides. Some embodiments of system 100 may be configured with an air treatment system 150 capable of removing enough contaminants from the circulating air received from human-occupied space 110 so as to reduce or eliminate the need to replace any of the circulating air within system 100 with makeup air from outside the building, vehicle or other structure.

According to some embodiments, air treatment system 150 may remove contaminants from the circulating indoor air received from human-occupied space 110 by forcing the air to flow through one or more adsorbent materials positioned within air treatment system 150. In some embodiments, one or more adsorbent materials may be oriented within the air treatment system 150 to provide substantially parallel flow paths through which the air may be directed. As the circulating indoor air flows through the one or more adsorbent materials, molecules of one or more contaminants within the air may be retained and captured by and within the adsorbent material(s). Adsorbent materials may include, but are not limited to, zeolites and other molecular sieves, activated charcoal, silica gel, porous alumina and metal-organic-framework materials.

In some embodiments, one or more of the adsorbent materials may be regenerated. More specifically, as contaminants accumulate on the surface of an adsorbent material, that material may eventually become saturated with contaminants such that additional contaminants cannot be adsorbed. The total amount of contaminant(s) captured by an adsorbent material prior to saturation may depend on the size, thickness and/or volume of the adsorbent material included within air treatment system 150, as well as many other parameters, including without limitation, the type of adsorbent, the species and concentration of contaminants and the temperature. Upon saturation, embodiments of the present disclosure may be configured to regenerate or remove the contaminants from the adsorbent material. Some embodiments may regenerate an adsorbent material using thermal swing desorption and/or pressure swing desorption. Such regeneration may cause the adsorbent material to release trapped contaminants by elevating the temperature of the adsorbent material and/or flowing a relatively inert purge gas through the adsorbent material. In some embodiments, the adsorbent materials of the present disclosure may be regenerated within the air treatment system 150 without being removed.

Embodiments of the adsorbent materials used in the air treatment modules and systems of the present disclosure may be configured in various shapes and sizes according to design requirements. In some embodiments, an adsorbent material may be configured as a sheet of material generally square and/or rectangular in shape. The sheet of adsorbent material may be formed entirely of adsorbent material and hardened to provide a rigid sheet of adsorbent material and/or may be included within a rigid support frame. In some embodiments, the adsorbent material be sprayed, sprinkled or otherwise attached to a porous rigid support sheet of material such as a screen. Specific dimensions of the adsorbent material may depend upon and vary according to the requirements of the HVAC system within which the air treatment system 150 is incorporated.

In some embodiments, one or more inserts of adsorbent material within air treatment system 150 may be relatively thin to eliminate the need to use large pressures to force air through the adsorbent material. On the other hand, those same embodiments may also require that the adsorbent material not be too thin so as to reduce its ability to sufficiently capture and retain contaminants. Furthermore, if an insert of adsorbent material is too thin there may also be insufficient adsorbent material mass to collect the required amount of contaminants over extended periods of time, especially if one of the targeted contaminants (like $CO_2$) occurs in relatively large amounts. Accordingly, the size, shape and number of inserts of adsorbent material used with an embodiment of the air treatment system 150 may be determined based on balancing various factors including, but not limited to, flow impedance, pressure gradient, adsorbent capacity and physical arrangement.

Embodiments of the present disclosure may achieve desired flow throughput and impedance requirements by arranging two or more inserts of adsorbent material in a substantially parallel flow configuration. In parallel flow configurations of the present disclosure, air streams through the two or more inserts may contribute additively to produce the overall flow of air through the air treatment system. In some embodiments, the size of the one or more inserts which include adsorbent material may be configured for easy transport and manual installation by human operators. Some embodiments of the inserts may be configured in a sheet-like form. For example, the present disclosure provides for generally rectangular inserts of adsorbent material which may be less than 1.5 meters in length per side and weigh no more than a few tens of kilograms. Some embodiments may use thin inserts of adsorbent material to avoid excessive air flow resistance. For example, insert thickness may be no more than a few centimeters, according to some embodiments. Inserts according to the present disclosure may also weigh approximately 10 kg each. In the case of packed zeolite, which has an approximate density of 1 $g/cm^3$, a 10 kg insert could be approximately 70 cm×70 cm×2 cm. Forty inserts of this size may represent a total surface area of 20 $m^2$ and the need to have air flowing through forty inserts in a substantially parallel configuration may require an extremely efficient arrangement, as explained in more detail below.

Embodiments of the air treatment system 150 may include two or more air treatment modules (see, e.g., FIG. 2) arranged vertically and/or horizontally for accommodating higher throughputs of circulating indoor air by providing two or more inserts of adsorbent material in parallel. Each air treatment module may have one or more inserts of adsorbent material. Embodiments of the present disclosure may configure the geometric layout of the inserts of adsorbent material in a highly compact arrangement to provide numerous, possibly hundreds, of inserts of adsorbent material in a scalable and relatively discreet footprint.

Advantages associated with arranging numerous inserts of adsorbent material in a parallel and compact configuration may be appreciated by considering the actual amount of adsorbent material and air flow required in an average office building. Under normal conditions, an average human may produce approximately 40-50 grams of $CO_2$ per hour. To counteract this accumulation of $CO_2$, an air treatment system of an HVAC system for a 200-person human-occupied space may be designed to adsorb and remove approximately 10 kg of $CO_2$ per hour. Because the density of $CO_2$ is about 2 $kg/m^3$, the volume of $CO_2$ in this example would equal 5 $m^3$. Thus, if the percentage of $CO_2$ in the air is to be kept below 0.1%, the air treatment system would have to scrub the equivalent of at least 5,000 $m^3$ of indoor air every hour to remove the 5 $m^3$ of $CO_2$ from the human-occupied space.

Although molecular sieves have been known to adsorb up to 20% of their weight in $CO_2$ under normal temperature and high concentration conditions, in reality it is more proper to assume a smaller capacity due to a variety of factors, including limited range of temperature swing, low concentration conditions, the presence of humidity and the accumulation of contaminants. An adsorption capacity of 5-10% of the adsorbent mass per cycle is common, although for some adsorbents and conditions smaller numbers could be more realistic. Thus, an insert of adsorbent material may be dimensioned to collect the amount of $CO_2$ created within a single adsorption-desorption cycle. An air treatment system designed for continuous 2-hour operation and regeneration cycles at 10 kg per hour of $CO_2$, would require 400 kg of adsorbent, and more if the adsorption capacity is lower than 5%.

FIG. 2a shows an embodiment of an air treatment module 200 according to the present disclosure. The air treatment module 200 may include a support frame 240 and, in some embodiments, be generally configured as a rectangular prism, as shown in FIG. 2a. The support frame 240 may have side walls 242, an inlet end wall 244, outlet end wall 245, a top panel 246 and a bottom panel 248. In some embodiments, the support frame 240, as well as the support frames for any air treatment module of the present disclosure, may be formed out of a single monolithic panel of material or by rigidly joining the various panels (242, 244, 245, 246, 248) together. The support frame 240, as well as the support frames for any air treatment module of the present disclosure, may be made from any one or more suitable materials, including without limitation, metal, fiberglass or plastic. The support frame 240 may also include one or more air inlets 210. Air inlet 210 may be formed within inlet end wall 244 or, in some embodiments, may be formed by and between inlet end wall 244, side walls 242 and top panel 246 or bottom panel 248. That is, inlet end wall 244 may extend only partially along the height, H, of the support frame 240. The support frame 240 may also include one or more air outlets 220. Air outlet 220 may be formed within outlet end wall 245 or, in some embodiments, may be formed by and between outlet end wall 245, side walls 242 and top panel 246 or bottom panel 248. That is, outlet end wall 245 may extend only partially along the height, H, of the support frame 240. The embodiment of the air treatment module 200 shown in FIG. 2a includes one air inlet 210 formed (e.g., machined) in inlet end wall 244 and one air outlet 220 formed (e.g., machined) in outlet end wall 245. In some embodiments, as shown in FIG. 2a, the air inlet 210 may be formed in the inlet end wall 244 toward the top panel 246 and the air outlet 220 may be formed in the outlet end wall 245 toward the bottom panel 248, such that the air inlet 210 and air outlet 220 are offset from each other.

Embodiments of the air treatment module 200 may also include an insert 230. The insert 230 may be positioned partially or entirely within the support frame 240 and, in some embodiments, may be arranged in a sheet-like form. In some embodiments, the insert 230 may traverse the entirely length, L, of the support frame 240 and/or the entire width, W, of the support frame 240. In some embodiments, the insert 230 may be positioned substantially at the midpoint of the height, H, of the support frame 240, as shown in FIG. 2a. While FIG. 2a shows insert 230 oriented substantially parallel to the top panel 246 and/or bottom panel 248 of the support frame 240, embodiments of the present disclosure contemplate various orientations of the insert 230 within the support frame 240. The insert 230 may be formed as an integral portion of the support frame 240 or may be removably inserted into the support frame 240, such as by sliding the insert 230 into the support frame 240 from a side or an end of the frame 240. In such embodiments, a side wall 242, inlet end wall 244 and/or outlet end wall 245 may be removable to provide an opening for insert 230 to be inserted and/or removed as needed. The insert 230 may be held within support frame 240 by any suitable means, including without limitation, clips attached to, or channels or tracks formed in, the side walls 242, inlet end wall 244 and/or outlet end wall 245. Such configurations may also apply to any inserts and support frames of any embodiments of the present disclosure.

The insert 230 may be and/or include one or more adsorbent materials through which circulating indoor air passes, according to embodiments of the present disclosure. In some embodiments, the insert 230 may be a porous material, such as a rigid screen or tray, to which one or more adsorbent materials may be attached or otherwise supported by. In some embodiments, the insert 230 may be a rigid body of one or more adsorbent materials.

In operation, circulating indoor air from a human-occupied space (see FIG. 1) may be caused to enter the air treatment module 200 at air inlet 210 from a duct (see FIG. 1), flow through insert 230 and exit air treatment module 200 at air outlet 220. According to the embodiment shown in FIG. 2a, because the outlet end wall 245 is closed above the insert 230, the circulating indoor air entering the air inlet 210 is forced to flow through the insert 230 to reach the air outlet 220. As the circulating indoor air flows through insert 230, it intimately contacts the one or more adsorbent materials and one or more targeted contaminants are removed from the circulating indoor air by the adsorbent material.

Figure 2B:
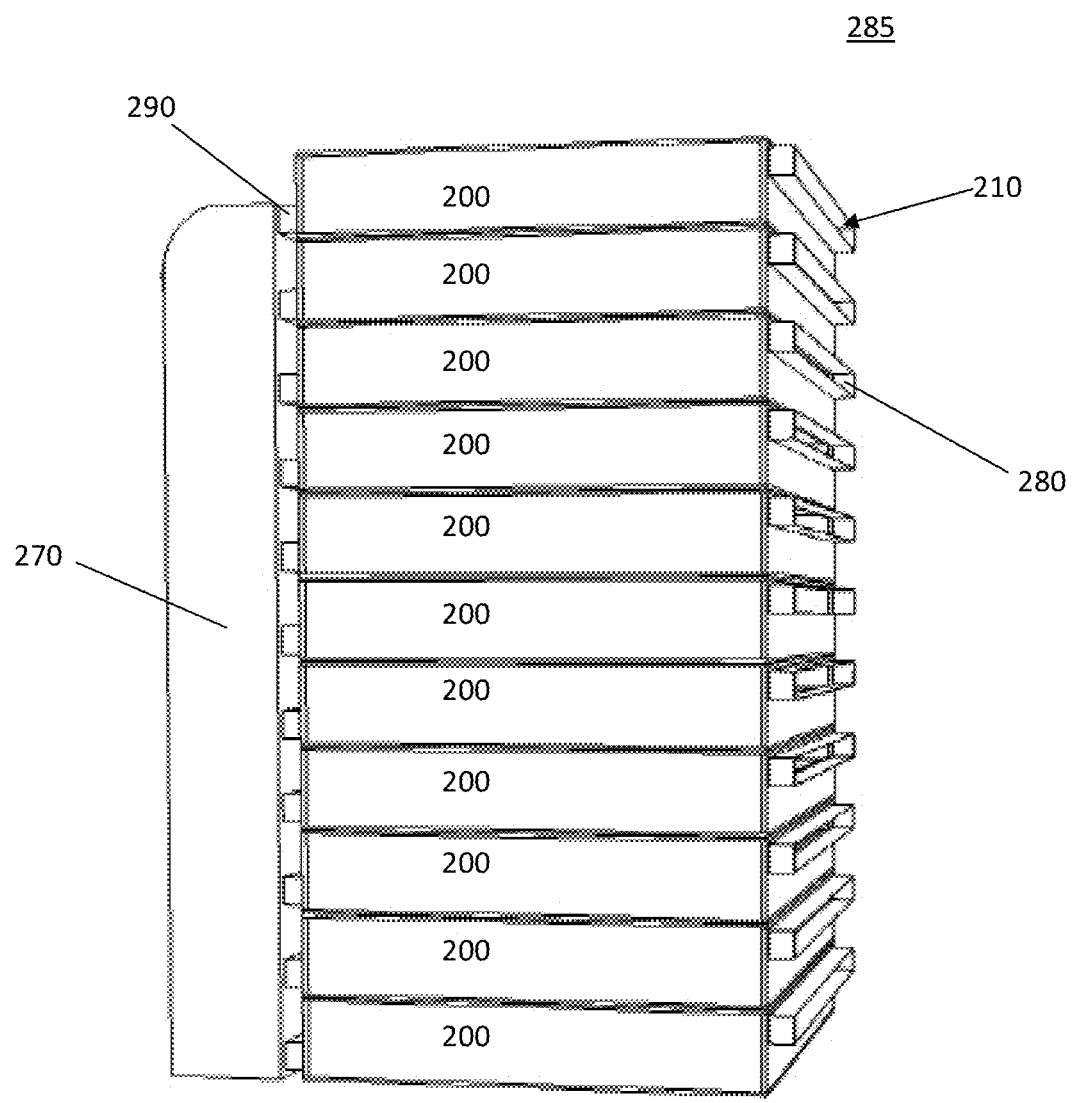
FIG. 2b shows a plurality of the air treatment modules of FIG. 2a stacked vertically according to some embodiments of the present disclosure.

FIG. 2b shows an air treatment system 285 having a configuration of eleven air treatment modules 200 stacked vertically. The air treatment modules 200 may be arranged to create parallel air flow paths or channels. In some embodiments, the air outlets 220 of each air treatment module 200 may feed into a common outlet plenum 270. A common inlet plenum (not shown) may be provided at the air inlets 210 to feed each air treatment module 200 with circulating indoor air. Some embodiments of the air treatment system 285 may include connectors 290 which extend between the air inlets 210 and air outlets 220 and the common inlet plenum (not shown) and common outlet plenum 270, respectively.

Figure 3:
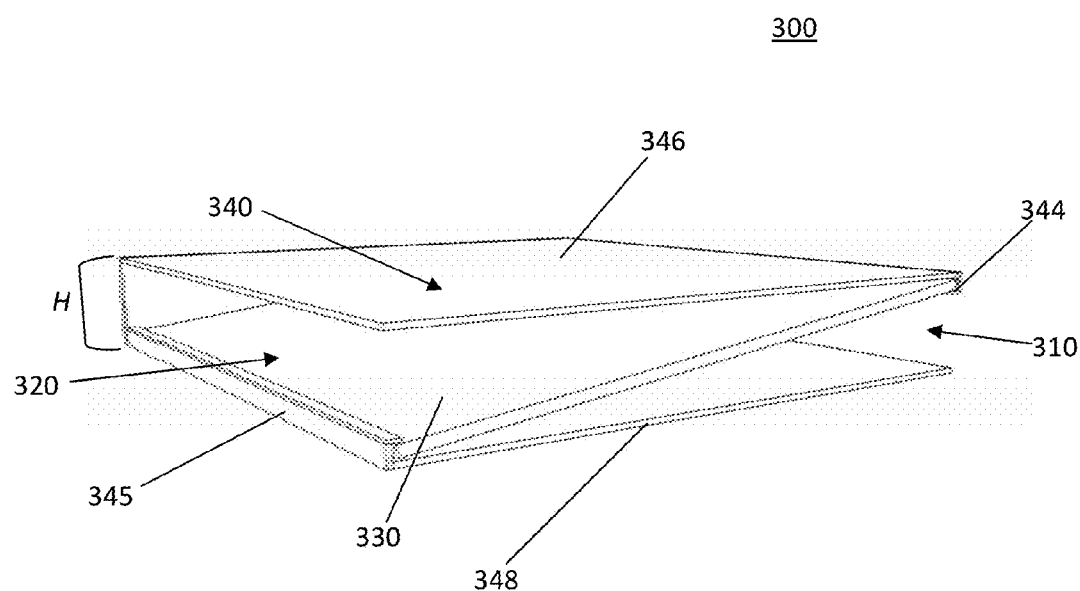
FIG. 3 shows an embodiment of an air treatment module according to some embodiments of the present disclosure.

FIG. 3 shows an embodiment of an air treatment module 300 having a support frame 340 and an insert 330 positioned within support frame 340. The support frame 340 may have side walls 342, an inlet end channel 344, an outlet end channel 345, a top panel 346 and a bottom panel 348. An air inlet 310 may be formed directly below the inlet end channel 344 by and between the side walls 342, inlet end channel 344 and the bottom panel 348. An air outlet 320 may be formed directly above the outlet end channel 345 by and between the side walls 342, outlet end channel 345 and the top panel 346. The inlet end channel 344 may be configured as part of the top panel 346 or as a separate component rigidly attached to the top panel 346. The outlet end channel 345 may be configured as part of the bottom panel 348 or as a separate component rigidly attached to the bottom panel 348. In FIG. 3, a side wall 342 is removed for purposes of illustrating the arrangement of insert 330 within the support frame 340. As shown in FIG. 3, the insert 330 may be positioned on an angle relative to the top panel 346 and/or bottom panel 348. In some embodiments, the insert 330 may be removably inserted into the support frame 340 and sized appropriately so as to be held in place within the support frame 340 by inlet end channel 344 and outlet end channel 345, as FIG. 3 illustrates. Insert 330 may be arranged in a sheet-like form.

In operation, circulating indoor air from a human-occupied space (see FIG. 1) may be caused to enter the air treatment module 300 at air inlet 310 from a duct (see FIG. 1), flow through insert 330 and exit the air treatment module 300 at the air outlet 320. As shown in FIG. 3, the orientation of the insert 330 within the support frame 340 blocks the flow path of the circulating indoor air entering the air inlet 310 to cause the air to flow through the insert 330 to reach the air outlet 320. As the air flows through insert 330, it intimately contacts one or more adsorbent materials included within or on insert 330 and one or more targeted contaminants are removed from the air. As shown in FIG. 3, the air inlet 310 and the air outlet 320 are not offset vertically from each other as in the embodiment of FIG. 2a. In some embodiments, because it may be necessary to arrange a large number of air treatment modules 300 together, the height, H, of each air treatment module 300 may be minimized by adjusting the angle of the insert 330 within the support frame 340. The insert 330 may be inserted and/or removed through an opening in one or both of the side walls 342 or by removing a side wall 342, an inlet end channel 344 or an outlet end channel 345.

Figure 4A:
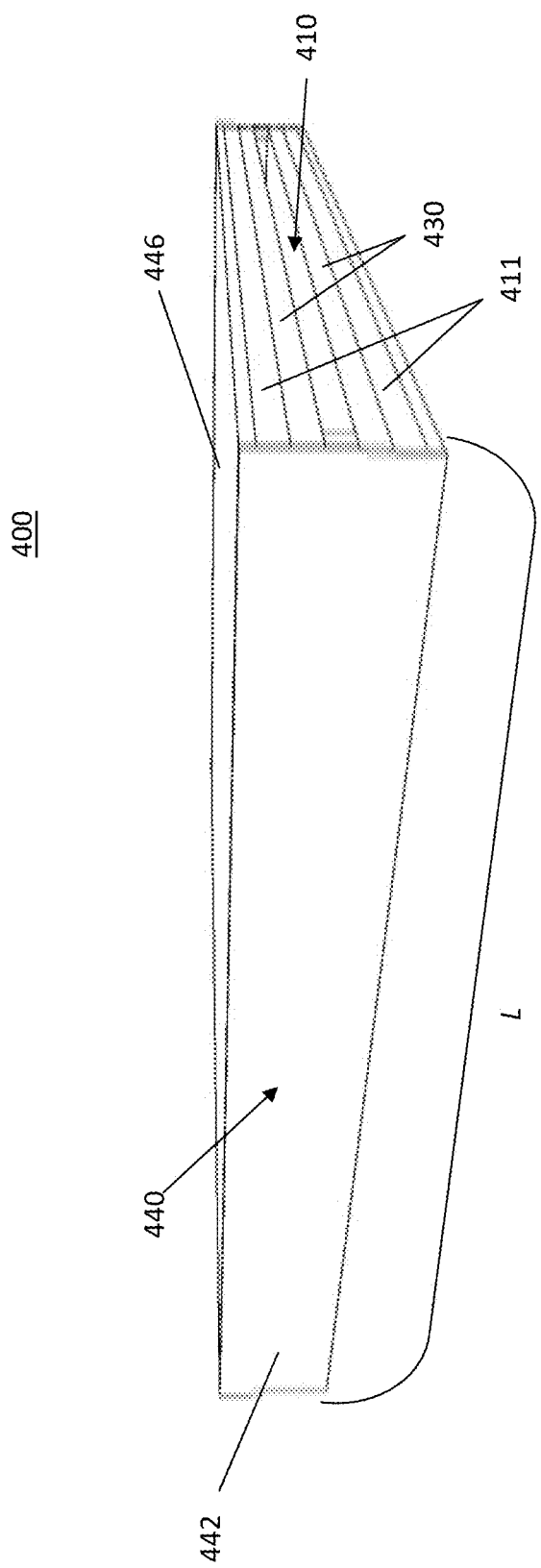
FIGS. 4a and 4b show an embodiment of an air treatment module according to some embodiments of the present disclosure.
Figure 4B:
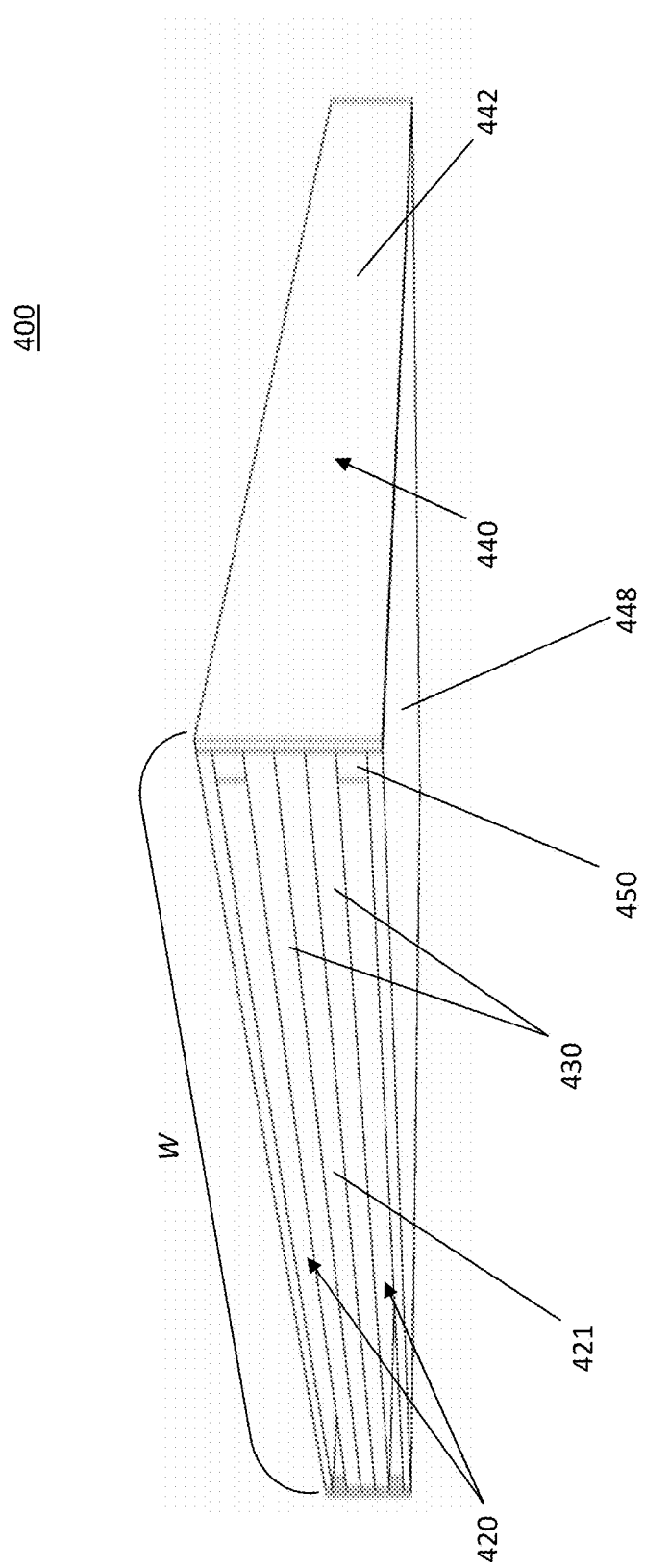

FIGS. 4a and 4b show an embodiment of an air treatment module 400 according to the present disclosure. The air treatment module 400 may include a support frame 440 having side walls 442, a top panel 446 and a bottom panel 448. In some embodiments, the air treatment module 400 may have two or more inserts 430 positioned partially or entirely within the support frame 440 and traversing substantially the entire length, L, and width, W, of the support frame 440. Inserts 430 may be arranged, according to some embodiments, in a sheet-like form, as shown in FIGS. 4a and 4b. In some embodiments, the two or more inserts 430 may be substantially parallel to each other and include one or more adsorbent materials. The inserts 430 may be held in position within the support frame 440 by tabs 450 formed on the side walls 442 of the support frame 440 and/or by inlet end baffles 411 and outlet end baffles 421. Some embodiments of the module 400 may position two or more inserts 430 within the support frame 440 in an orientation substantially parallel to the top panel 446 and/or bottom panel 448 of the air treatment module 400. An air inlet 410 may be formed by and between the side walls 442 and the inserts 430, as shown in FIG. 4a. Two or more air outlets 420 may be formed by and between the side walls 442, top panel 446, bottom panel 448 and inserts 430, as shown in FIG. 4b. In some embodiments, one or more inlet end baffles 411 may be configured between the inserts 430 and the top panel 446 and bottom panel 448 and the side walls 442, as shown in FIG. 4a. In some embodiments, one or more outlet end baffles 421 may be configured between the inserts 430 and the top panel 446 and bottom panel 448 and the side walls 442, as shown in FIG. 4b. The baffles (411, 421) may be integrally formed as part of the side walls 442, top panel 446 and/or bottom panel 448 or may be separate components rigidly attached to the side walls 442, top panel 446 and/or bottom panel 448.

In operation, circulating indoor air from a human-occupied space (see FIG. 1) may be caused to enter the air treatment module 400 at air inlet 410 from a duct (see FIG. 1), flow through inserts 430 and exit the air treatment module 400 at air outlets 420. As shown in FIGS. 4a and 4b, the side walls 442 and outlet end baffle 421 cooperate to provide a closed flow path into which the circulating air enters after passing through air inlet 410. As a result, the circulating indoor air is forced to flow upward or downward through the inserts 430 to reach the air outlets 420. In other words, on the inlet side, the air is only allowed to flow into the space between the inserts 430 where a common inlet plenum (not shown) may be placed but cannot exit the air treatment module 400 between the inserts 430 because the other end is blocked by outlet end baffle 421. However, because there are air outlets 420 above and below the inserts 430, the air is forced to flow through the inserts 430, whereby contaminants in the air are captured and retained by the adsorbent material(s) of inserts 430. In some embodiments, as shown in FIGS. 4a and 4b, the air flow paths within the air treatment module 400 may be substantially parallel to each other.

Figure 5B:
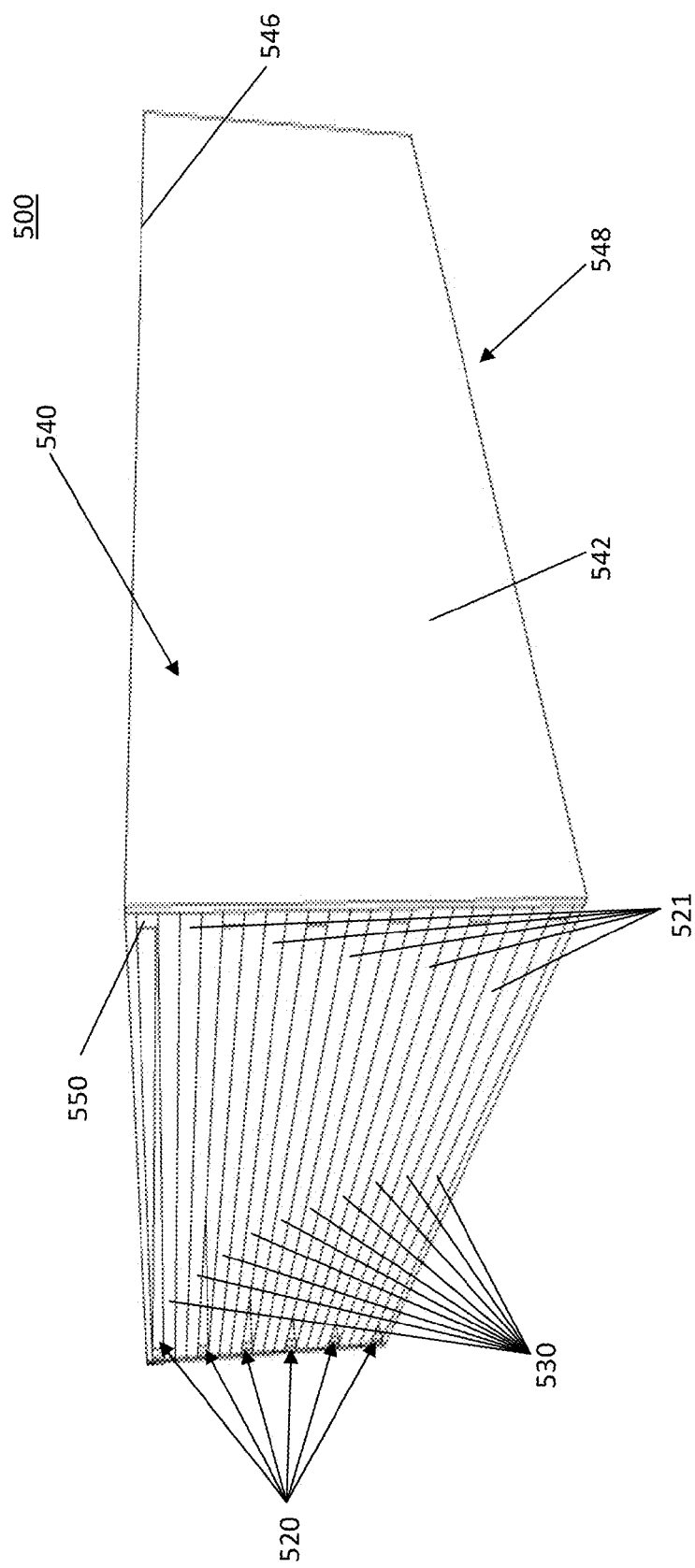

FIGS. 5a and 5b show an embodiment of an air treatment module 500 according to the present disclosure. The air treatment module 500 may include a support frame 540 having side walls 542, a top panel 546 and a bottom panel 548. In some embodiments, the air treatment module 500 may have two or more inserts 530 positioned partially or entirely within the support frame 540 and traversing substantially the entire length, L, and width, W, of the support frame 540. Inserts 530 may be arranged, according to some embodiments, in a sheet-like form. In some embodiments, the two or more inserts 530 may be substantially parallel to each other and include one or more adsorbent materials. The inserts 530 may be held in position within the support frame 540 by and between tabs 550 (see FIG. 5b) formed on the side walls 542 of the support frame 540 and inlet end baffles 511 and outlet end baffles 521. Some embodiments of the module 500 may position two or more inserts 530 within the support frame 540 in an orientation substantially parallel to the top panel 546 and/or bottom panel 548 of the air treatment module 500. Two or more air inlets 510 may be formed by and between the side walls 542, top panel 546, bottom panel 548 and inserts 530, as shown in FIG. 5a. Two or more air outlets 520 may be formed by and between the side walls 542, top panel 546, bottom panel 548 and inserts 530, as shown in FIG. 5b. In some embodiments, two or more inlet end baffles 511 may be configured between the side walls 542, top panel 546, bottom panel 548 and inserts 530, as shown in FIG. 5a. In some embodiments, one or more outlet end baffles 521 may be configured between the side walls 542, top panel 546, bottom panel 548 and inserts 530, as shown in FIG. 5b. The baffles (511, 521) may be integrally formed as part of the side walls 542, top panel 546 and/or bottom panel 548 or may be separate components rigidly attached to the side walls 542, top panel 546 and/or bottom panel 548.

In operation, circulating indoor air from a human-occupied space (see FIG. 1) may be caused to enter the air treatment module 500 at air inlet 510 from a duct (see FIG. 1), flow through inserts 530 and exit the air treatment module 500 at air outlets 520. As shown in FIGS. 5a and 5b, the side walls 542 and outlet end baffle 521 may cooperate to provide a closed flow path into which the circulating indoor air enters after passing through air inlet 510. As a result, the air is forced to flow upward or downward through at least the inserts 530 directly above and below the closed flow path to reach one or more of the air outlets 520. In other words, air flows into the air inlets 510 from a common inlet plenum (not shown) and into parallel flow paths from between the inserts 530. Because the parallel flow paths between the inserts 530 are enclosed by side walls 542 and outlet end baffles 521, the air is forced to flow upward and downward through adjacent pairs of inserts 530 and out one or more of the air outlets 520, whereby contaminants in the air are captured and retained by the adsorbent material of inserts 530. Thus, according to some embodiments of the present disclosure, such as the air treatment module 500 shown in FIGS. 5a and 5b, a large number of inserts including one or more adsorbent materials for removing contaminants can be provided within a compact space, creating a large number of parallel flow paths with a large total effective cross-sectional area of adsorbent material through which large volumes of circulating air can pass.

Figure 6:
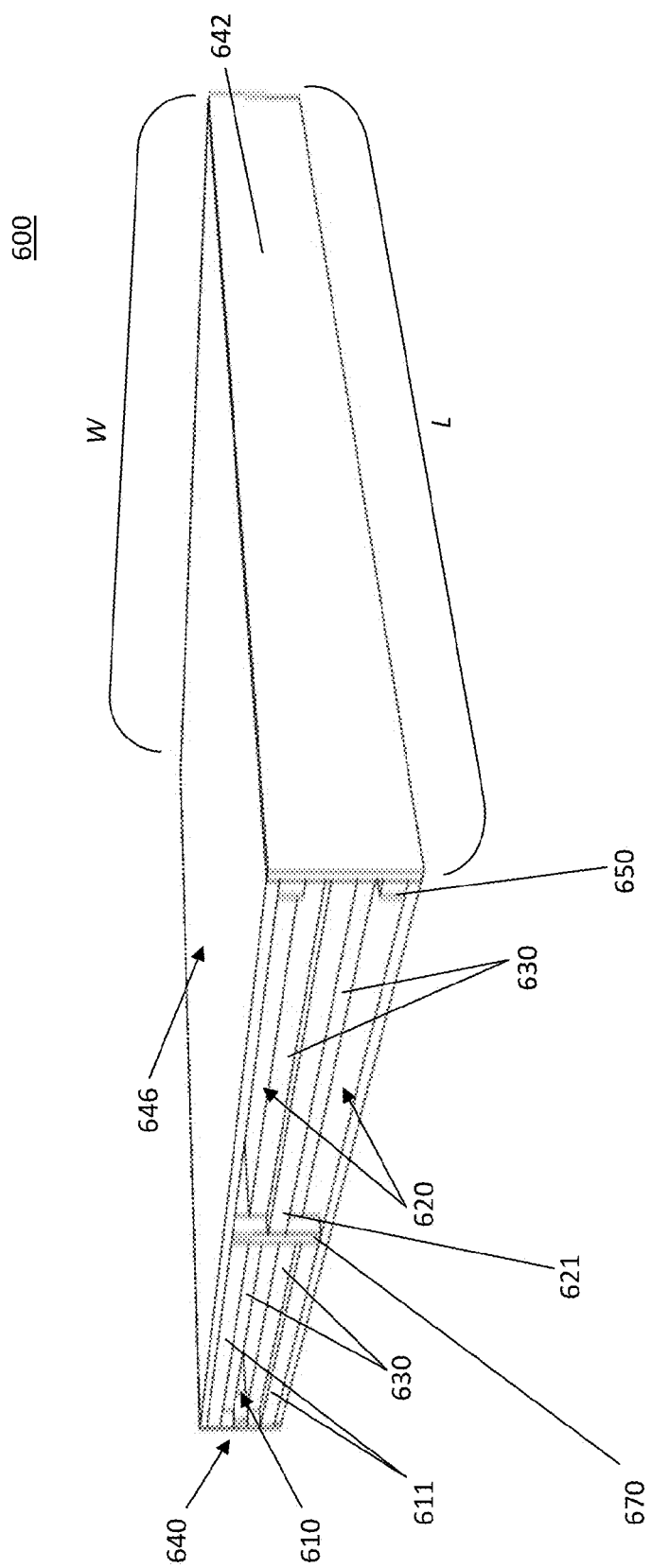
FIG. 6 shows an embodiment of an air treatment module according to some embodiments of the present disclosure.

FIG. 6 shows an embodiment of an air treatment module 600 according to the present disclosure. Air treatment module 600 may include a support frame 640 having side walls 642, a top panel 646, a bottom panel 648 and a back panel (not shown). In some embodiments, the support frame 640 may be divided by a partition 670 located at approximately the midpoint of the width, W, of the support frame 640 or at some other position along the width, W, of the support frame 640. Some embodiments of the air treatment module 600 may be configured with one or more air inlets 610 and one or more air outlets 620 located on the same side of the module 600, as shown in FIG. 6. In some embodiments, the air treatment module 600 may have two or more inserts 630 positioned partially or entirely within the support frame 640 and to one side of partition 670 to form the one or more air inlets 610. Inserts 630 may be arranged, according to some embodiments, in a sheet-like form. Inserts 630 may traverse substantially the entire length, L, and width, W, of the support frame 640. In such embodiments, the inserts 630 may have a notch or cut-out to accommodate the partition 670. In some embodiments, the inserts 630 may traverse the entire length, L, but extend only from a side wall 642 to the partition 670. In some embodiments, one insert may extend the entire width, W, of the support frame 640 and one insert may extend only between a side wall 642 and the partition 670.

The two or more inserts 630 may be substantially parallel to each other and/or the top panel 646 and/or bottom panel 648 of the module 600 and include one or more adsorbent materials. Inserts 630 may be maintained within position in the support frame 640 by and between tabs 650 formed on the side walls 642 of the support frame 640 and inlet end baffles 611 and outlet end baffles 621, as shown in FIG. 6. Some embodiments of the module 600 may position two or more inserts 630 within the support frame 640 in a substantially horizontal orientation relative to the length, L, of the air treatment module 600. Two or more air inlets 610 may be formed by and between a side wall 642, partition 670, top panel 646, bottom panel 648 and/or inserts 630, as shown in FIG. 6. Two or more air outlets 620 may be formed by and between a side wall 642, partition 670, top panel 646, bottom panel 648 and/or inserts 630, as shown in FIG. 6. In some embodiments, two or more inlet end baffles 611 may be positioned between a side wall 642, the partition 670, top panel 646, bottom panel 648 and/or inserts 630, as shown in FIG. 6. In some embodiments, one or more outlet end baffles 621 may be configured between a side wall 642, the partition 670, top panel 646, bottom panel 648 and/or inserts 630, as shown in FIG. 6. The baffles (611, 621) may be integrally formed as part of the side walls 642, top panel 646 and/or bottom panel 648 or may be separate components rigidly attached to the side walls 642, top panel 646, partition 670 and/or bottom panel 648.

In operation, circulating indoor air from a human-occupied space (see FIG. 1) may be caused to enter the air treatment module 600 at air inlet 610 from a duct (see FIG. 1), flow through inserts 630 and exit the air treatment module 600 at air outlets 620. As shown in FIG. 6, the side walls 642 and outlet baffle 621 cooperate to provide a closed flow path between the inserts 630 into which the circulating indoor air enters after passing through air inlet 610. As a result, the air is forced to flow upward or downward through the inserts 630 at least directly above and below the closed flow path. In some embodiments, because inlet end baffles 611 may be positioned on the inlet side between partition 670 and a side wall 642, the air that has passed through the inserts 630 is directed toward and out of the air outlets 620. This configuration and other similar embodiments may be useful in various circumstances, including but not limited to when the overall system layout requires a common inlet plenum and common outlet plenum to be adjacent to each other along the same side of an arrangement of air treatment modules. In some embodiments, placing the plenums together on the same side of the air treatment module may make the inlets and/or outlets on the opposite side of the air treatment module 600 available to be used for regeneration or provides access for service and/or maintenance.

Figure 7:
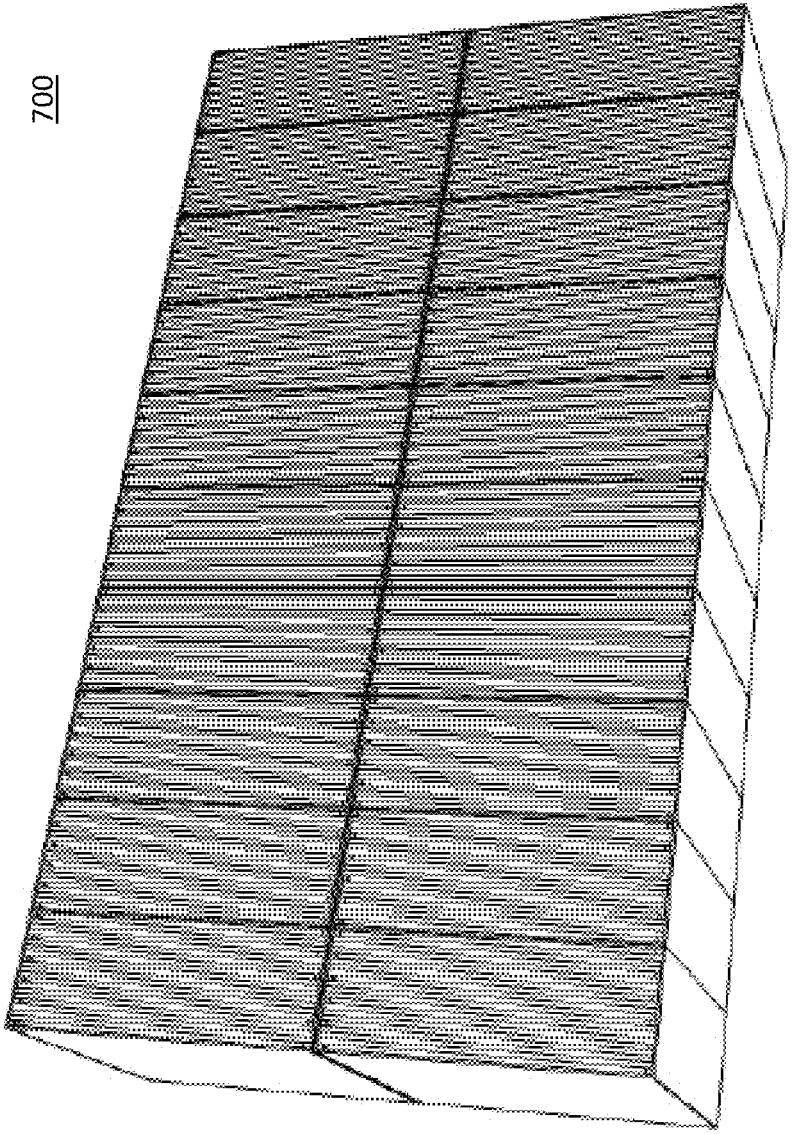
FIG. 7 shows an arrangement of a plurality of air treatment modules according to some embodiments of the present disclosure.

As with embodiments of the air treatment module 200, embodiments of the air treatment modules 300, 400, 500 and 600 may also be arranged vertically and/or horizontally. For example, FIG. 7 shows an embodiment of a hybrid arrangement 700 of air treatment modules where the inserts are oriented vertically rather than horizontally. While the principle of operation and air flow patterns are substantially the same as modules employing horizontally-oriented inserts, the vertical orientation may differ from a mechanical standpoint. That is, vertical inserts may have several potential advantages, including that the inserts are less likely to bow in the middle due to their own weight and, because vertical inserts stand side-by-side rather than on top of each other, a large number of inserts will not have to create a tall vertical stack.

A tall vertical stack has several mechanical drawbacks, including but not limited, difficult access to the upper modules for service and maintenance and a large weight load on the lower modules in the stack due to cumulative weight. There may also be less temperature and pressure variations in a horizontal arrangement. On the other hand, horizontal arrangements require a larger footprint which may not be available or desirable.

Figure 8:
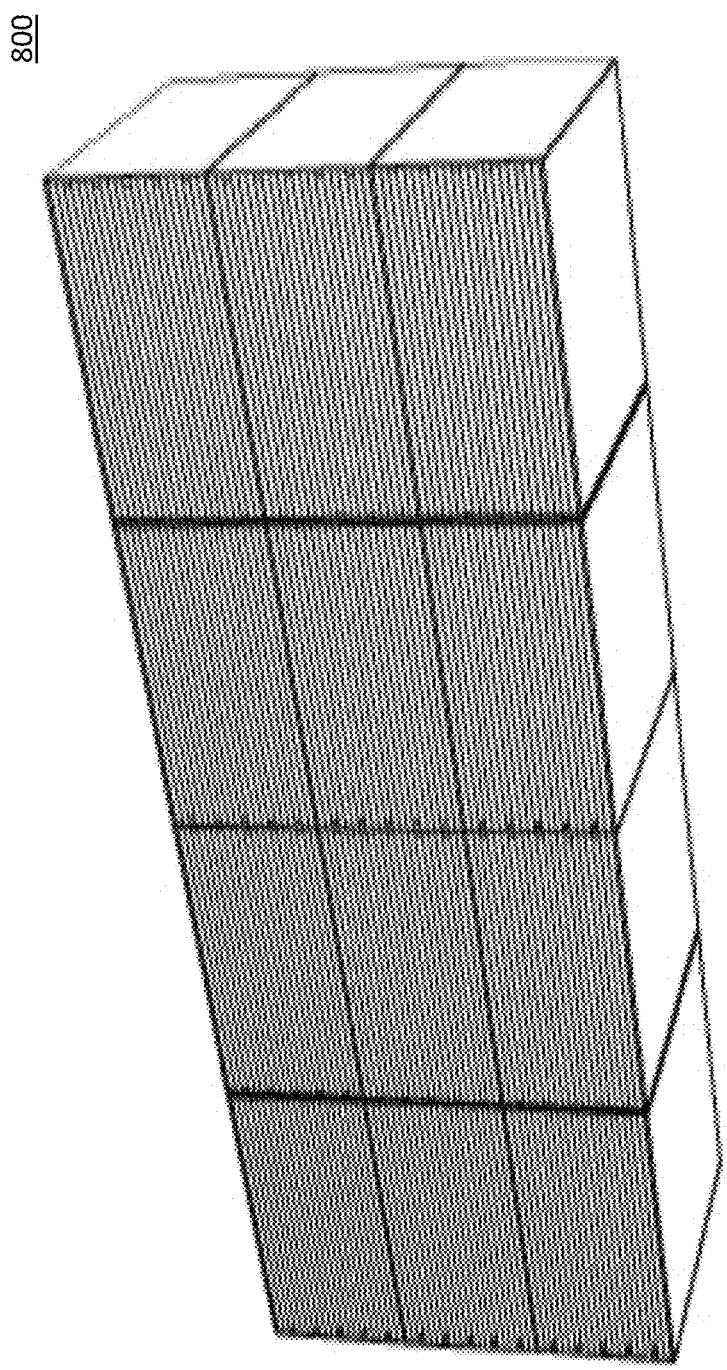
FIG. 8 shows an arrangement of a plurality of air treatment modules according to some embodiments of the present disclosure.

FIG. 8 shows an embodiment of a hybrid arrangement 800 of air treatment modules where the inserts are oriented horizontally but stacked in vertical columns joined to each other side-by-side. The choice between vertically or horizontally oriented inserts may be made with respect to any of the air treatment module embodiments discussed herein.

The integration of multiple air treatment modules of the present disclosure into an HVAC system may be achieved by attaching the modules to a common inlet plenum and/or a common outlet plenum, either or both of which may include a combination of valves and/or shutters, as well as fans or blowers, to control the flow of air during one of three possible modes of operation. More specifically, in some embodiments, an air treatment module and/or arrangement of air treatment modules (e.g., a vertical stack) according to the present disclosure may have at least three modes of operation including (1) active adsorption mode, (2) desorption/regeneration mode and/or (3) shutdown or disconnect. In mode (1), indoor air may flow from the ducts (see FIG. 1) into the air treatment system, through the air treatment modules and back into the ducts. In this mode, contaminants may be captured and retained by the adsorbent materials within the air treatment modules and the treated air may be returned to the ducts of the HVAC system.

In mode (2), the air treatment modules may be arranged for regeneration by heat or another form of energy or by pressure swing desorption, to cause the release of contaminants captured and retained within the adsorbent material. In some embodiments, contaminants that are released through regeneration may be removed from the air treatment system by flowing purge gas or by pumping away the released gases and disposing of the contaminants outside the building, vehicle or other structure. Some embodiments may heat the adsorbent materials by flowing heated purge gas through the air treatment system and subsequently directing the heated purge gas to flow outside. The purge gas may be heated inside the plenum or externally using any available heat source, including without limitation solar energy, electric, gas, oil, hot water and/or so-called waste heat, for example heat from compressors or engines. In some embodiments, a combination of two or more such heat sources may be used to achieve the required performance and economic objectives under changing conditions.

In mode (3), the air treatment modules may be disconnected from the HVAC system and from the source of purge gas, by closing any interconnecting valves or shutters. Disconnection and/or isolation of the air treatment system from the HVAC system may be necessary, for example, when the air treatment system is undergoing maintenance and/or repair. Another possible mode of operation, mode (4), may exist in some embodiments and be referred to as a "cool down" mode, where a regenerated air treatment system is allowed to cool down, e.g., with or without external air flow, before being reconnected to the HVAC system to prevent unwanted heating of internal air by the still-warm, regenerated air treatment system.

Figure 9:
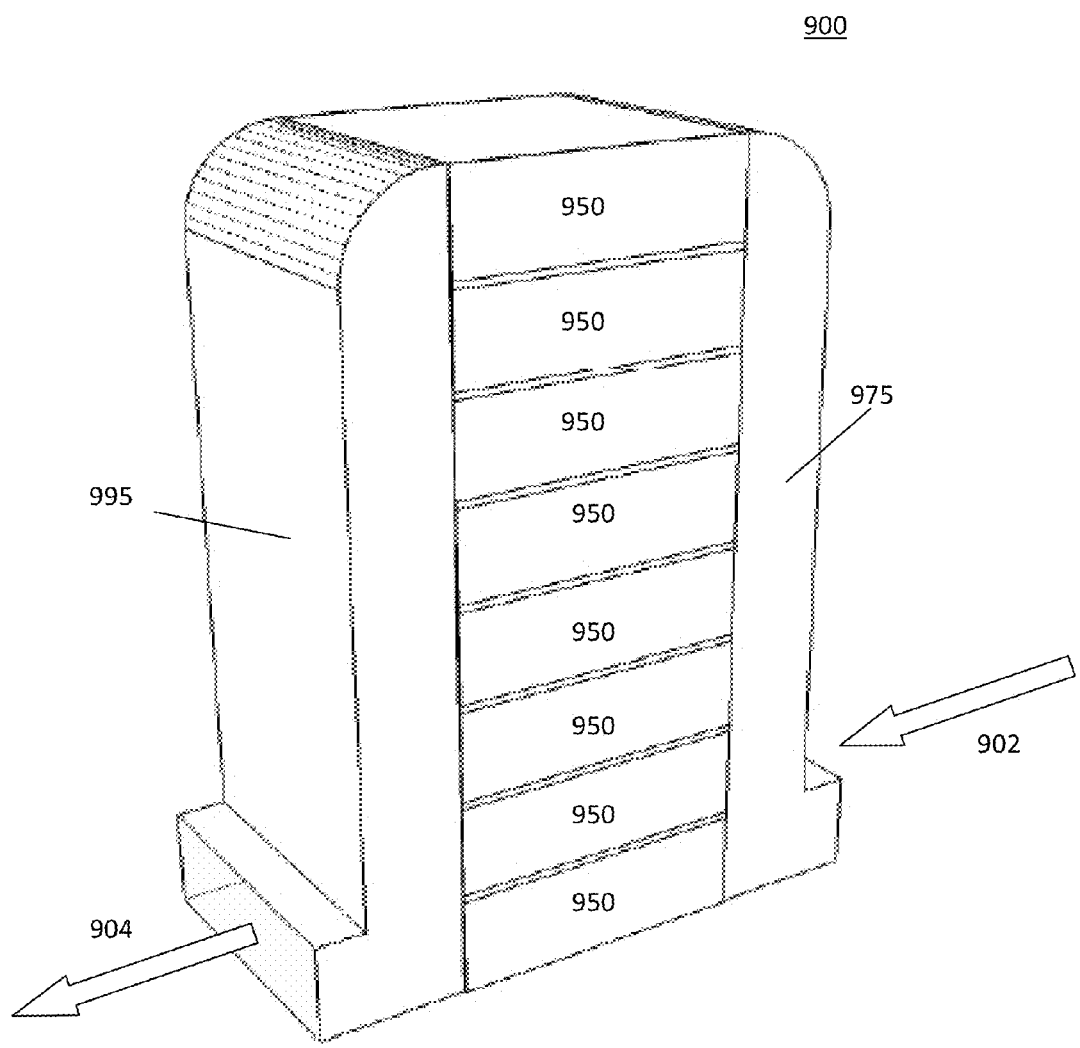
FIG. 9 shows a plurality of air treatment modules stacked vertically and in fluid communication with a common inlet plenum and a common outlet plenum, according to some embodiments of the present disclosure.

FIG. 9 shows an embodiment of an air treatment system 900 configured with a stack of air treatment modules 950, a common inlet plenum 975 and a common outlet plenum 995.

In some embodiments, such as the one shown in FIG. 9, the common inlet plenum 975 and common outlet plenum 995 may be arranged on opposite sides of the vertical stack formed by the air treatment modules 950. The common inlet plenum 975 and common outlet plenum 995 may each be sealed off at the top of the vertical stack. In operation, circulating indoor air 902 may enter at the bottom of the common inlet plenum 975 and flow into the air inlets (not shown) of each of the air treatment modules 950. Inside the modules 950, the circulating indoor air 902 may be caused to pass through one or more inserts included within each of the modules 950, exit the air outlets (not shown) in each of the air treatment modules 950 and flow into the common outlet plenum 995 as supply air 904. The supply air 904 is directed downwardly to the bottom of the common outlet plenum 995 and rejoins the main air flow of the HVAC system. The velocity and amount of air flow 902 entering the common inlet plenum 975 and supply air 904 exiting the common outlet plenum 995 may be managed by a central air handling unit (not shown here) having fans, valves, shutters and other controls that govern the operation of the unit.

Figure 10:
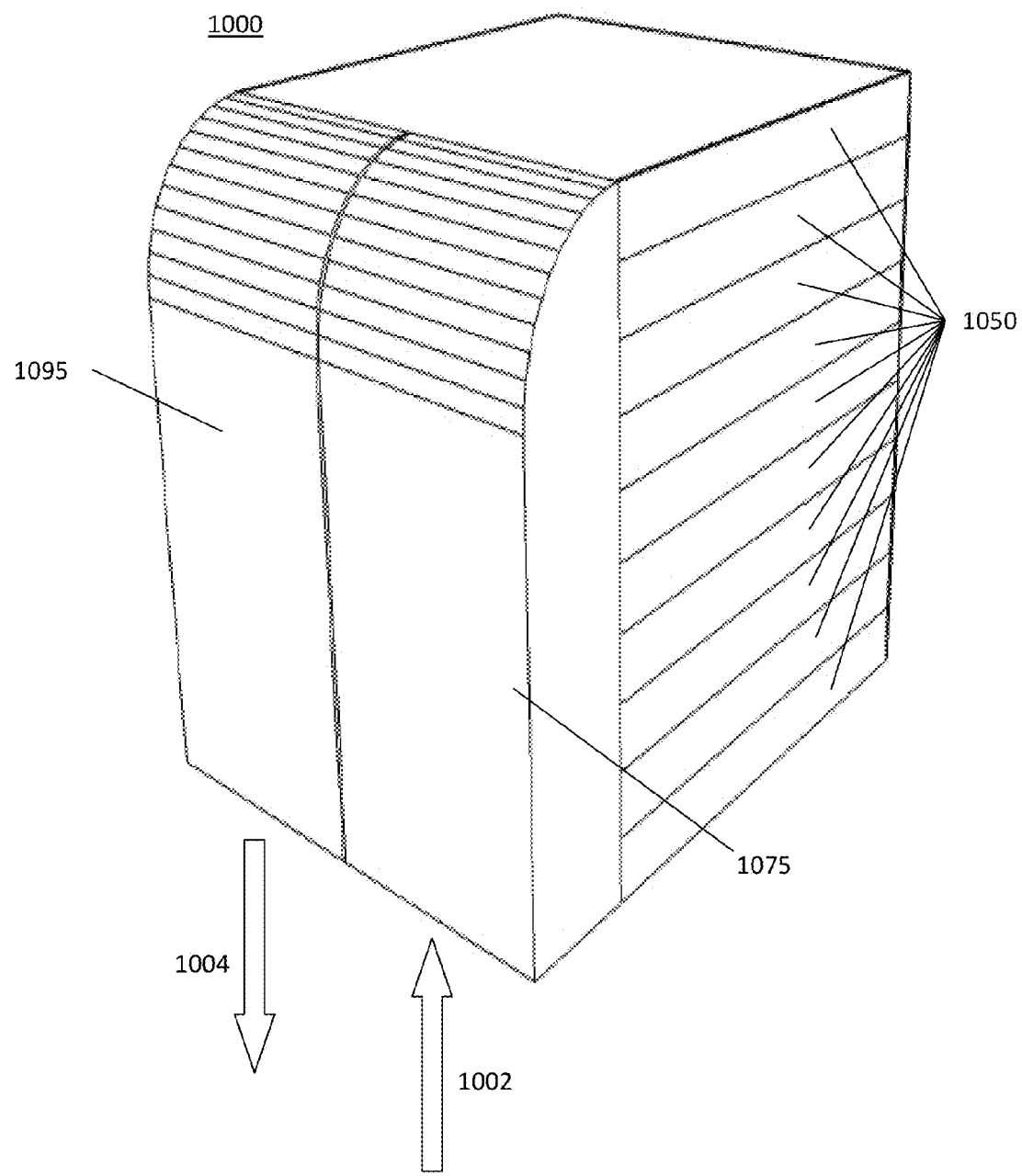
FIG. 10 shows a plurality of air treatment modules stacked vertically and in fluid communication with a common inlet plenum and a common outlet plenum, according to some embodiments of the present disclosure.
Figure 11:
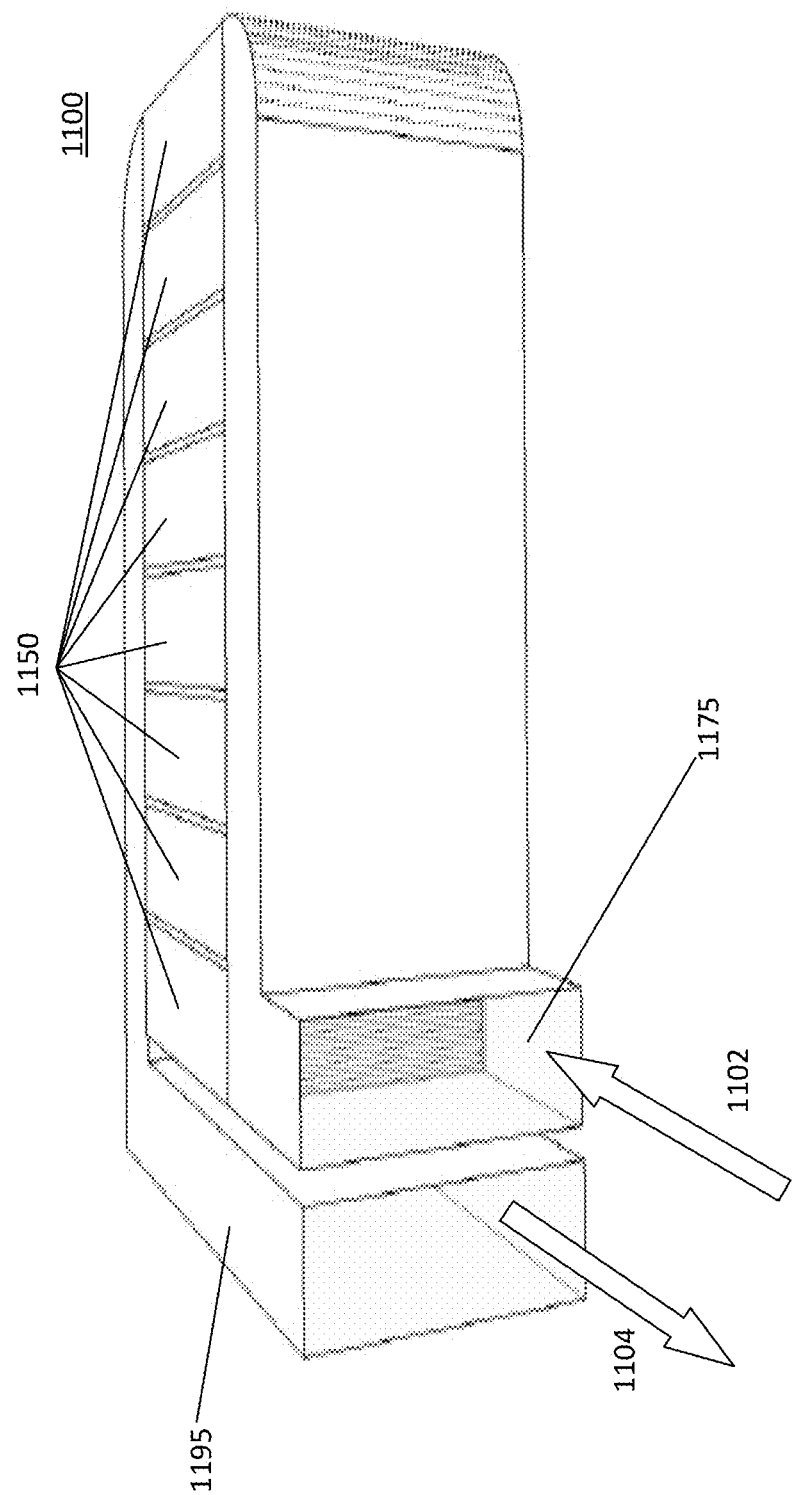
FIG. 11 shows a plurality of air treatment modules arranged horizontally and in fluid communication with a common inlet plenum and a common outlet plenum, according to some embodiments of the present disclosure.
Figure 12:
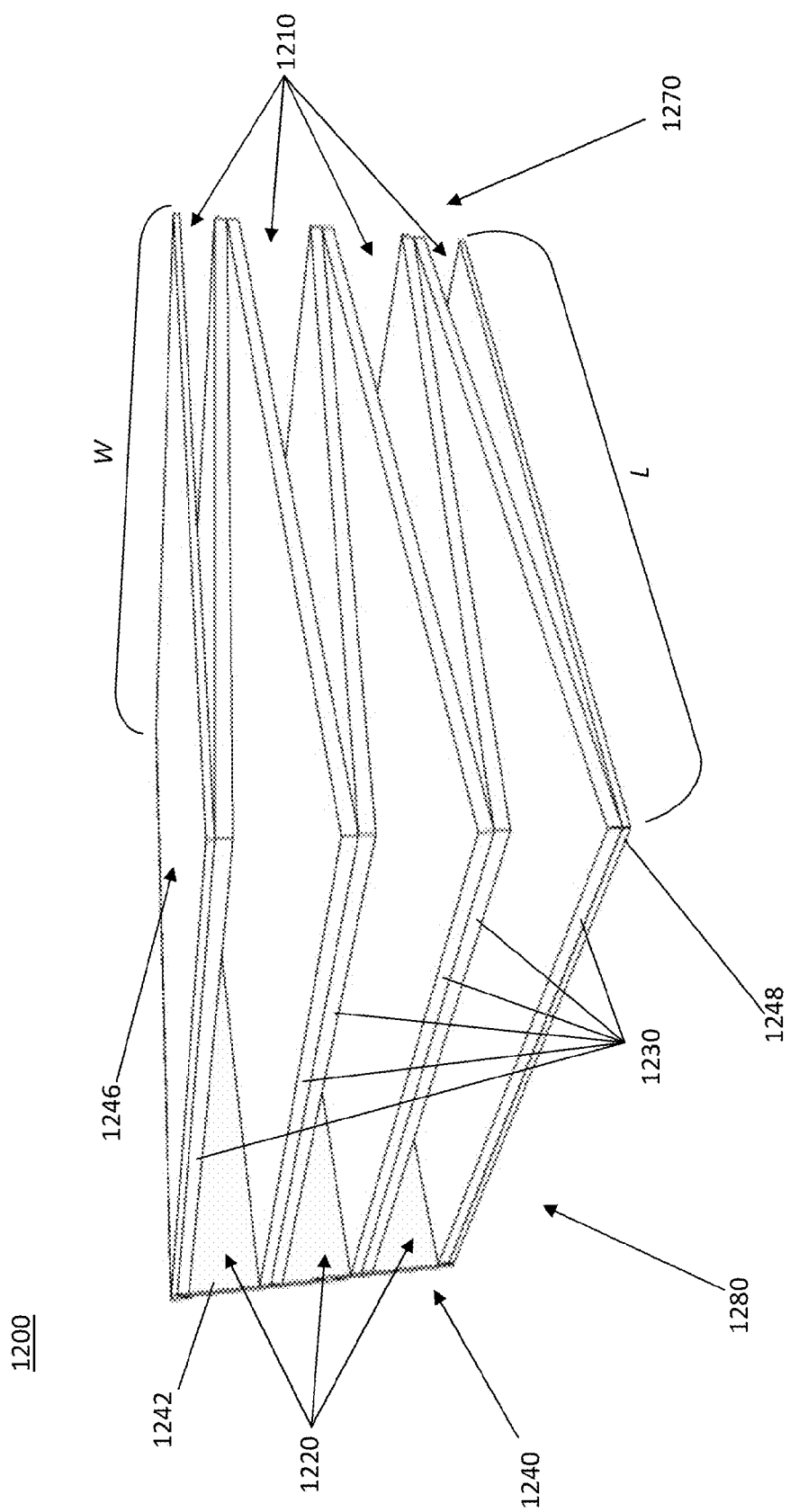
FIG. 12 shows an embodiment of an air treatment module according to some embodiments of the present disclosure.

As shown in FIG. 10, some embodiments of the present disclosure may arrange the common inlet plenum 1075 and common outlet plenum 1095 on the same side of the stack, for example, when the air treatment modules 1050 are configured similar to those depicted in FIG. 6. As shown in FIG. 11, some embodiments of the present disclosure may involve a horizontal air treatment system having a multiple vertically-oriented air treatment modules 1150 joined together. In such embodiments, common inlet plenum 1175 and common outlet plenum 1195 may be positioned horizontally as well.

Some embodiments of the present disclosure may be directed to an air treatment module 1200 that includes a support frame 1240 having side walls 1242, a top panel 1246 and a bottom panel 1248. The module 1200 may also include two or more inserts 1230 oriented at angles within the support frame 1240 relative to the top panel 1246 and/or bottom panel 1248. In some embodiments, adjacent inserts 1230 may contact each other along an edge of the insert 1230. Some embodiments of inserts 1230 may be arranged in a sheet-like form. Inserts 1230 may be held in place within the support frame 1240 by tabs or channels (not shown). The support frame 1240 may have an inlet end 1270 that is completely open and an outlet end 1280 that is completely open. The orientation of the inserts 1230 may form air inlets 1210 and air outlets 1220, as shown in FIG. 10. The inserts 1230 may be removably inserted into the support frame 1240 from one of the ends of the support frame 1240 or from a side by removing a side wall 1242.

In operation, circulating indoor air from a human-occupied space (see FIG. 1) may be caused to enter the air treatment module 1200 at the air inlets 1210 from a duct (see FIG. 1), flow through the inserts 1230 which form each air inlet 1210 and exit the air treatment module 1200 at the air outlets 1220. As shown in FIG. 10, each pair of angled inserts 1230 within the support frame 1240 form an air inlet 1210 and, at the same time, blocks the flow path of the circulating indoor air entering that air inlet 1210. As a result, the air is caused to flow either upward or downward through one of the two inserts 1230 which form the air inlet 1210 through which the air entered the air treatment module 1200. As the air flows through the inserts 1230, it intimately contacts one or more adsorbent materials of insert 1230 and one or more targeted contaminants are removed from the air. As with all the previously described air treatment module embodiments, embodiments of air treatment module 1200 may be arranged to form an air treatment system of multiple air treatment modules.

Some embodiments of the air treatment systems described herein according to the present disclosure may comprise two or more separate vertical stacks or horizontal arrangements that may be connected to a common plenum but operated and shuttered independently. Such embodiments allow one (or more) air treatment systems to undergo regeneration or shutdown while another air treatment system is still actively treating the air flow, thus providing uninterrupted service. The common plenum may be designed to automatically switch between vertical stacks or horizontal arrangements by opening and closing the appropriate valves, shutters and/or blowers, as well as any other elements used to control air flow and temperature. Some embodiments of the air treatment systems according to the present disclosure may have sensors and gauges, including but not limited to $CO_2$ meters, thermometers, flow meters and pressure gauges used to monitor system functionality and trigger automatic switching between modes of operation. One of switching function include without limitation turning an air treatment system from active mode to regeneration mode when elevated levels of contaminants are detected at the air outlets or in the common outlet plenum.

The embodiments set forth in the foregoing description do not represent all embodiments consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the embodiments described above may be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other embodiments may be within the scope of the appended claims.

What is claimed is:

1. An air treatment system for removing contaminants from indoor air, the system comprising:
    a source of indoor air providing an indoor airflow containing one or more contaminates;
    a source of purging air configured to provide a purging airflow to release contaminants adsorbed by an adsorbent;
    an air treatment module having one or more first air ports, one or more second air ports, and at least one insert including an adsorbent material, the at least one insert comprising a plurality of inserts;
    a support frame having one or more structural support members for supporting the plurality of inserts,
    wherein:
        the one or more first air ports and the one or more second air ports are formed by the support frame and the at least one insert, and
        the plurality of inserts are planar and positioned within the support frame such that a surface of each insert of the plurality of inserts is at an angle of less than about 30 degrees relative to airflow paths between the one or more first air ports and the one or more second air ports;
    controls configured to cause the system to operate in at least three operational modes including:
        an active adsorption mode in which the adsorbent material of the at least one insert adsorbs one or more contaminants from the indoor airflow,
        a regeneration mode for releasing contaminants from the adsorbent material of the at least one insert when exposed to the purging airflow, and
        a disconnect mode where substantially no air flows through the air treatment module,
    one or more valves arranged and configured to direct, during one or another operational mode, at least one of the indoor airflow and the purging airflow to flow to and from the air treatment module via the one or more first air ports and the one or more second air ports; and
    wherein:
        during the active adsorption mode, one of either the one or more first air ports or the one or more second ports is configured to receive the indoor airflow and remaining one of the one or more first air ports or the one or more second air ports not receiving the indoor airflow is configured to expel the indoor airflow such that the indoor airflow flows over and/or through adsorbent material of the at least one insert, and
        during the regeneration mode, one of the one or more first air ports or the one or more second air ports is configured to receive the purging airflow and remaining one of the one or more first air ports or the one or more second air ports is configured to expel the purging airflow such that the purging airflow flows over and/or through the adsorbent material of the at least one insert.

2. The system of claim 1, wherein the support frame includes an inlet side and an outlet side, and wherein the one or more first air ports are formed in the inlet side and the one or more second air ports are formed in the outlet side.

3. The system of claim 1, wherein the one or more first air ports and the one or more second air ports are formed adjacent to each other along one side of a support frame.

4. The system of claim 1, wherein the air treatment module is configured to be incorporated within an HVAC system.

5. The system of claim 1, wherein the one or more first air ports and the one or more second air ports are offset from each other.

6. The system of claim 1, wherein the adsorbent material is selected from the group consisting of molecular sieves, zeolite, activated charcoal, silica gel, porous alumina and metal-organic-framework materials.

7. The system of claim 1, wherein the adsorbent material removes at least one of carbon dioxide and volatile organic compounds from the indoor air.

8. The system of claim 1, further comprising a sensor and/or a gauge configured to measure temperature, pressure, flow rate and/or gas composition.

9. The system of claim 8, wherein switching of the system between the at least three operational modes is based on the measurement of the sensor and/or the gauge.

10. The system of claim 8, wherein the sensor and/or the gauge is a $CO_2$ meter configured to measure an amount of $CO_2$ in the indoor air.

11. The system of claim 1, further comprising a heating source configured to heat the purging airflow.

12. The system of claim 11, wherein the heating source includes solar energy, electricity, gas, oil, hot water and/or waste heat from compressors or engines.

13. A method for removing contaminants from indoor air, the method comprising:
    providing an indoor airflow containing one or more contaminates;
    providing a purging airflow configured to release contaminants adsorbed by an adsorbent;

providing an air treatment module having one or more first air ports, one or more second air ports, and at least one insert including an adsorbent material, the at least one insert comprising a plurality of inserts;

providing a support frame having one or more structural support members for supporting the plurality of inserts, wherein:

the one or more first air ports and the one or more second air ports are formed by the support frame and the at least one insert, and the plurality of inserts are planar and positioned within the support frame such that a surface of each insert of the plurality of inserts is at an angle of less than about 30 degrees relative to airflow paths between the one or more first air ports and the one or more second air ports;

causing the air treatment module to operate in at least three operational modes including:

an active adsorption mode in which the adsorbent material of the at least one insert adsorbs one or more contaminants from the indoor airflow, a regeneration mode for releasing contaminants from the adsorbent material of the at least one insert when exposed to the purging airflow, and a disconnect mode where substantially no air flows through the air treatment module, wherein:

during the active adsorption mode, one of either the one or more first air ports or the one or more second air ports is configured to receive the indoor airflow and the remaining one of the one or more first air ports or the one or more second air ports not receiving the indoor airflow is configured to expel the indoor airflow such that the indoor airflow flows over and/or through adsorbent material of the at least one insert, and during the regeneration mode, one of the one or more first air ports or the one or more second air ports is configured to receive the purging airflow and the remaining one of the one or more first air ports or the one or more second air ports is configured to expel the purging airflow such that the purging airflow flows over and/or through the adsorbent material of the at least one insert.

14. The method of claim 13, wherein the air treatment module is caused to operate in at least three operational modes by switching the air treatment module between the at least three operational modes based on temperature, pressure, flow rate and/or gas composition measurements of a sensor and/or a gauge.

15. The method of claim 13, wherein the support frame includes an inlet side and an outlet side, and wherein the one or more first air ports are formed in the inlet side and the one or more second air ports are formed in the outlet side.

16. The method of claim 13, wherein the one or more first air ports and the one or more second air ports are formed adjacent to each other along one side of a support frame.

17. The method of claim 13, wherein the air treatment module is configured to be incorporated within an HVAC system.

18. The method of claim 13, wherein the one or more first air ports and the one or more second air ports are offset from each other.

19. The method of claim 13, wherein the adsorbent material is selected from the group consisting of molecular sieves, zeolite, activated charcoal, silica gel, porous alumina and metal-organic-framework materials.

20. The method of claim 13, wherein the adsorbent material removes at least one of carbon dioxide and volatile organic compounds from the indoor air.

* * * * *